United States Patent
Adachi et al.

(10) Patent No.: US 10,872,605 B2
(45) Date of Patent: Dec. 22, 2020

(54) TRANSLATION DEVICE

(71) Applicant: Panasonic Intellectual Property Management Co., Ltd., Osaka (JP)

(72) Inventors: Yusuke Adachi, Osaka (JP); Takayuki Hayashi, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 216 days.

(21) Appl. No.: 16/031,536

(22) Filed: Jul. 10, 2018

(65) Prior Publication Data

US 2018/0322875 A1 Nov. 8, 2018

Related U.S. Application Data

(63) Continuation of application No. PCT/JP2017/015409, filed on Apr. 17, 2017.

(30) Foreign Application Priority Data

Jul. 8, 2016 (JP) ................................. 2016-136153

(51) Int. Cl.
*G10L 15/22* (2006.01)
*G06F 40/51* (2020.01)
(Continued)

(52) U.S. Cl.
CPC .............. *G10L 15/22* (2013.01); *G06F 40/51* (2020.01); *G06F 40/58* (2020.01); *G10L 15/005* (2013.01);
(Continued)

(58) Field of Classification Search
CPC ....... G10L 15/22; G10L 15/005; G10L 15/26; G10L 21/00; G10L 13/00; G10L 2015/221; G06F 40/58; G06F 40/51
See application file for complete search history.

(56) References Cited

U.S. PATENT DOCUMENTS 2,584,896 A * 2/1952 Maffris ................ A42B 1/24
2/209.13
8,121,335 B2 * 2/2012 Sharpe ................ A42B 1/248
381/376

(Continued)

FOREIGN PATENT DOCUMENTS

JP 2005-078318 3/2005
JP 2005-222136 8/2005
(Continued)

OTHER PUBLICATIONS

International Search Report of PCT application No. PCT/JP2017/015409 dated Jun. 27, 2017.
(Continued)

*Primary Examiner* — Michelle M Koeth
(74) *Attorney, Agent, or Firm* — McDermott Will & Emery LLP

(57) ABSTRACT

A translation device includes a first receiver, a second receiver, a first output unit, and a second output unit. The first receiver receives a first voice and converts the first voice into a first voice signal. The second receiver receives a second voice and converts the second voice into a second voice signal. The first output unit outputs a voice corresponding to second translation data generated based on the second voice signal. The second output unit outputs a voice corresponding to first translation data generated based on the first voice signal. The first receiver is disposed near a mouth of a first user. The first output unit is disposed at a position at which the first output unit is in contact with an ear of the first user. The second receiver and the second output unit are disposed on a head of the first user.

9 Claims, 15 Drawing Sheets

(51) Int. Cl.
  *G06F 40/58* (2020.01)
  *G10L 15/00* (2013.01)
  *G10L 21/00* (2013.01)
  G10L 13/00 (2006.01)
  G10L 15/26 (2006.01)
(52) U.S. Cl.
  CPC ............. *G10L 21/00* (2013.01); *G10L 13/00* (2013.01); *G10L 15/26* (2013.01); *G10L 2015/221* (2013.01)

(56) References Cited

U.S. PATENT DOCUMENTS

| | | | |
|---|---|---|---|
| 2004/0204207 A1* | 10/2004 | Parker | A42B 1/245 |
| | | | 455/575.2 |
| 2004/0243392 A1* | 12/2004 | Chino | G06F 40/20 |
| | | | 704/7 |
| 2007/0233471 A1 | 10/2007 | Ariu | |
| 2008/0077387 A1 | 3/2008 | Ariu | |
| 2008/0091407 A1 | 4/2008 | Furihata et al. | |
| 2013/0211818 A1 | 8/2013 | Sakamoto et al. | |
| 2013/0289971 A1* | 10/2013 | Parkinson | G10L 15/26 |
| | | | 704/2 |
| 2014/0066022 A1 | 3/2014 | Nasu et al. | |
| 2015/0039288 A1* | 2/2015 | Pedre | G10L 15/26 |
| | | | 704/3 |
| 2015/0081271 A1 | 3/2015 | Sumita et al. | |
| 2015/0157078 A1* | 6/2015 | Kendis | A45F 5/02 |
| | | | 24/3.12 |
| 2015/0370786 A1* | 12/2015 | Kwon | G06F 40/58 |
| | | | 704/2 |
| 2017/0148436 A1* | 5/2017 | Sugiura | G06F 3/167 |

FOREIGN PATENT DOCUMENTS

| | | |
|---|---|---|
| JP | 2006-301223 | 11/2006 |
| JP | 2007-264473 | 10/2007 |
| JP | 2007-272260 | 10/2007 |
| JP | 2007-280164 | 10/2007 |
| JP | 2008-077601 | 4/2008 |
| JP | 2008-083459 A | 4/2008 |
| JP | 2012-059121 | 3/2012 |
| JP | 2013-009432 A | 1/2013 |
| JP | 2013-011744 | 1/2013 |
| JP | 2013-164515 | 8/2013 |
| JP | 2015-014675 | 1/2015 |
| JP | 2015-060332 | 3/2015 |
| JP | 2015-118710 A | 6/2015 |
| JP | 2015-521404 | 7/2015 |
| WO | 2013/163293 | 10/2013 |

OTHER PUBLICATIONS

International Preliminary Examination Report of PCT application No. PCT/JP2017/015409 dated Apr. 17, 2018.

* cited by examiner

FIG. 4
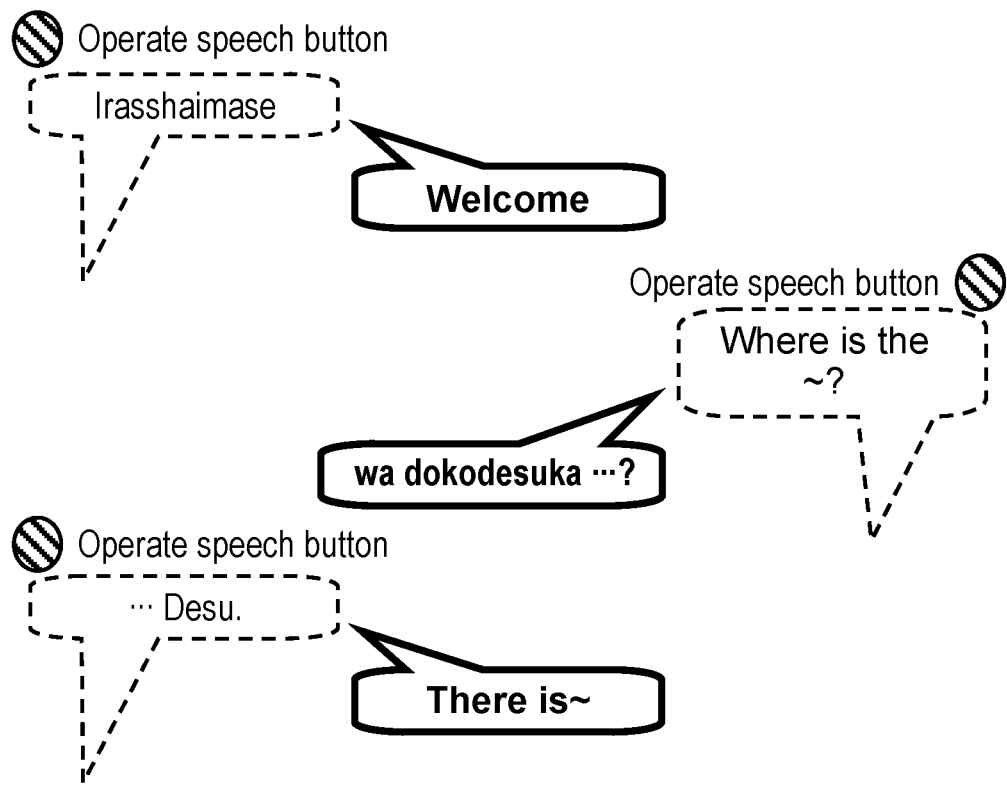
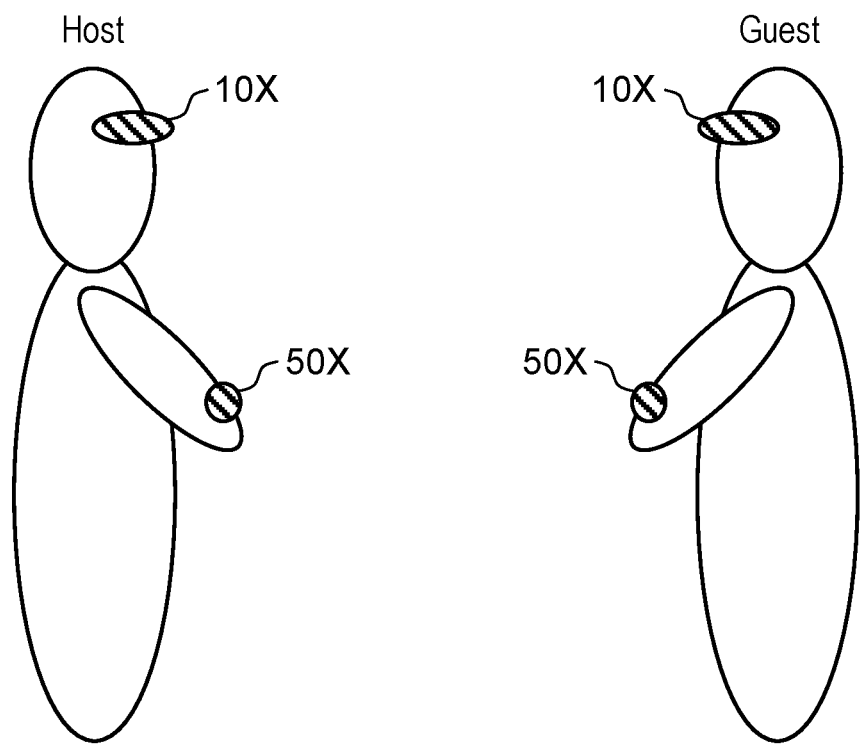

FIG. 5
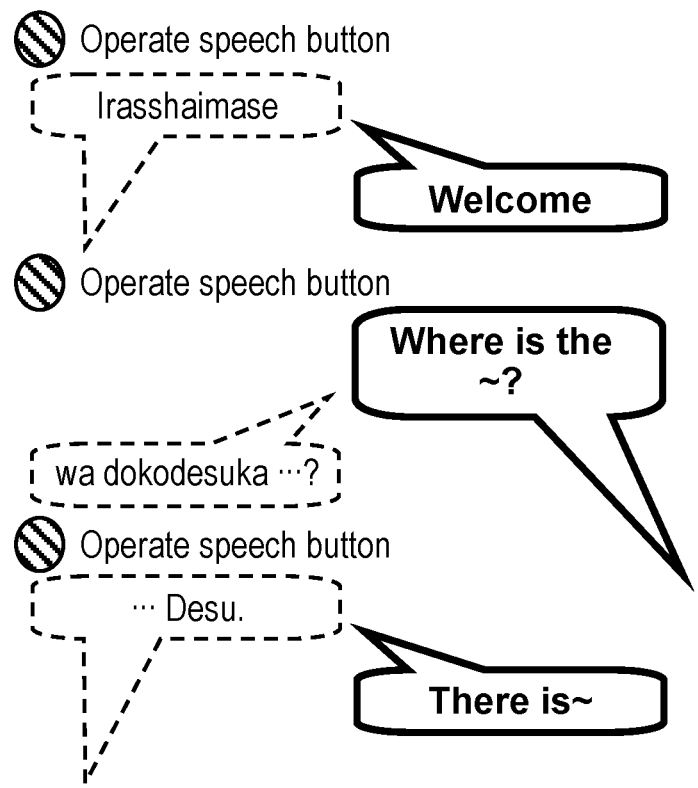
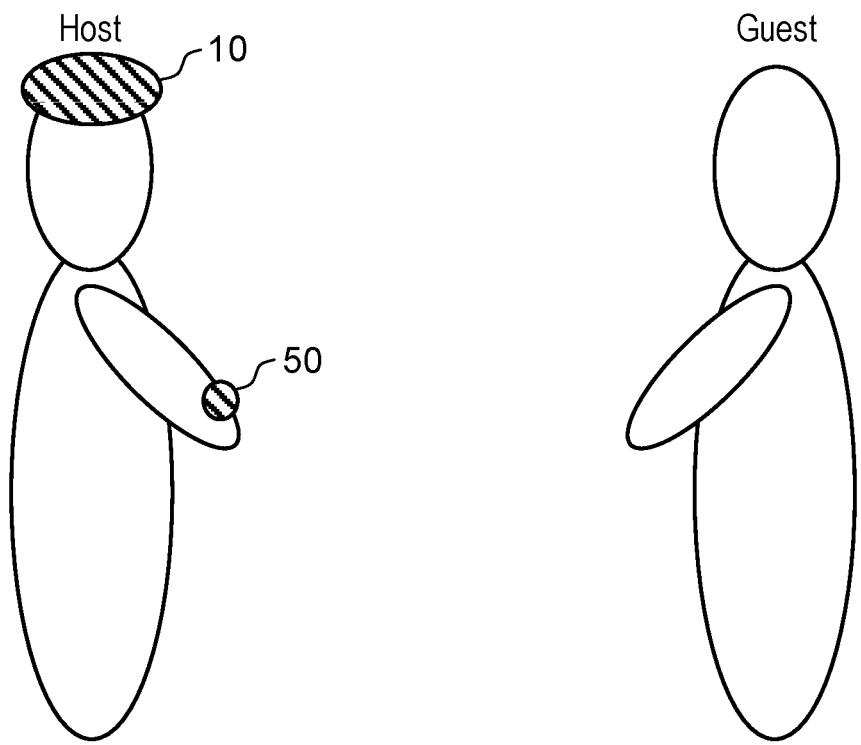

TRANSLATION DEVICE

TECHNICAL FIELD

The present disclosure relates to a translation device that translates a conversation between a first user and a second user and relates to a translation method for the conversation.

BACKGROUND ART

PTL 1 and PTL 2 disclose a glass type display used as a wearable translation device that is used while being worn on a human body. This display converts a voice signal of a speaker into text data and translates the text data to text data in a language different from the language of the original text data. The display displays the text data translated in the different language, in a field of view of the glasses. With this arrangement, for example, a host (guide) wearing the translation device can understand, by watching the displayed translation, contents of what a guest (traveler) is talking.

CITATION LIST

Patent Literature

PTL 1: Unexamined Japanese Patent Publication No. 2007-280164
PTL 2: Unexamined Japanese Patent Publication No. 2012-59121

SUMMARY

In the case of the above-mentioned glass type display, both of the host and guest have to wear a glass type display to translate a bilateral conversation between the host and the guest. At that time, two languages are flying between the host and the guest, and the guest can thus be confused.

The present disclosure provides a translation device that can reduce the confusion of the guest caused by voices in two languages flying between the host and the guest when the bilateral conversation between the host and the guest is translated.

The translation device in the present disclosure includes a first receiver, a second receiver, a first output unit, and a second output unit. The first receiver receives a first voice and converts the first voice into a first voice signal. The first voice is voice of a first user and the first user wears the translation device. The second receiver receives a second voice and converts the second voice into a second voice signal. The second voice is voice of a second user and the second user is different from the first user. The first output unit outputs a voice corresponding to second translation data generated by translating second voice data based on the second voice signal. The second output unit outputs a voice corresponding to first translation data generated by translating first voice data based on the first voice signal. The first receiver is disposed near a mouth of the first user. The first output unit is disposed at a position at which the first output unit is in contact with an ear of the first user. The second receiver and the second output unit are disposed on a head of the first user.

A translation device in the present disclosure can reduce the confusion of the guest caused by the voices in two languages flying between the host and the guest when a bilateral conversation between the host and the guest is translated.

BRIEF DESCRIPTION OF DRAWINGS

FIG. 4 is a diagram for describing an example of how a conventional glass type translation device for translating a one-way conversation is worn and used.

FIG. 5 is a diagram for describing an example of how a hat type translation device of the present exemplary embodiment capable of translating a bilateral conversation is worn and used.

DESCRIPTION OF EMBODIMENTS

Hereinafter, exemplary embodiments are described in detail with appropriate reference to the drawings. However, unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the inventors provide the accompanying drawings and the following description to help those skilled in the art to sufficiently understand the present disclosure, but do not intend to use the drawings or the description to limit the subject matters of the claims.

First Exemplary Embodiment

Hereinafter, a first exemplary embodiment will be described with reference to FIGS. 1 to 5. In the present exemplary embodiment, for convenience of description, a description will be given assuming that a translation device is used while being worn by a host (guide) (first user) guiding a guest (traveler) (second user) from abroad.

[1-1. Configuration]

[1-1-1. Physical Configuration of Translation Device]

Figure 1:
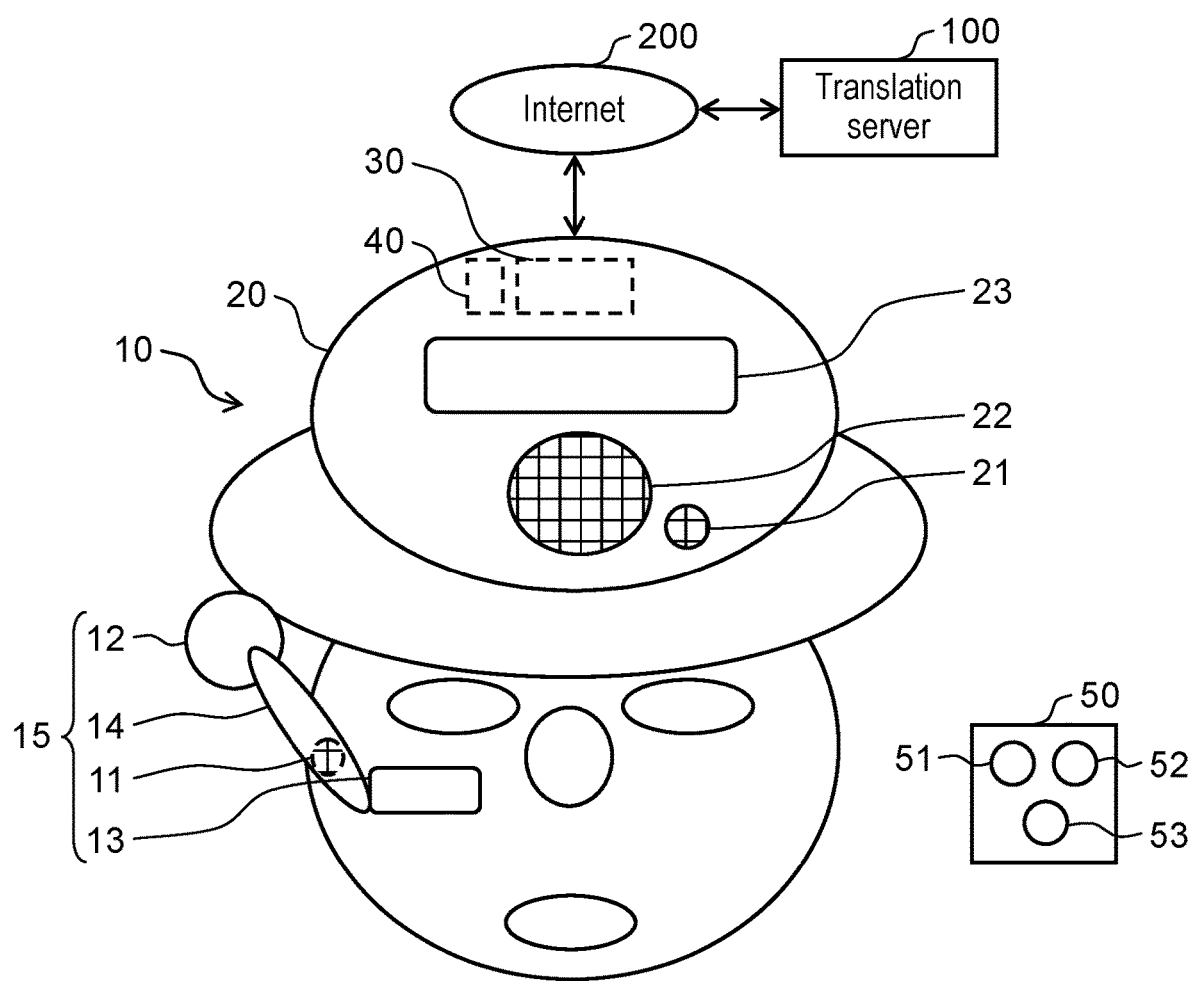
FIG. 1 is a diagram showing an outer appearance of a translation device according to a first exemplary embodiment.

FIG. 1 is a diagram showing an outer appearance of a translation device according to a first exemplary embodiment. As shown in FIG. 1, translation device 10 is a wearable device used while being worn by a host, and more specifically is a hat type device used while being worn on a head of the host. Translation device 10 includes hat 20 and includes microphones 11, 21, speakers 12, 22, and displays 13, 23 attached to hat 20. Microphone 11, speaker 12, and display 13 are for the host, and microphone 21, speaker 22, and display 23 are for a guest.

Microphone 11, speaker 12, and display 13 for a host and support member 14 constitute headset 15 and are provided on a side part of hat 20. Speaker 12 is a headphone type speaker. Speaker 12 is disposed on a side of hat 20 so as to be in contact with an ear of the host when translation device 10 is worn on a head of the host. In the present disclosure, the headphone type speaker includes a speaker of an overhead type (headband type), a neckband type, an ear-mounted type (clip type), an inner-ear type, a canal type, or the like. Support member 14 extends from speaker 12. On an end part of support member 14, which is an opposite side with respect to speaker 12, there are provided microphone 11 and display 13. In other words, when translation device 10 is worn on the head of the host, microphone 11 is disposed near a mouth of the host, and display 13 is disposed near an eye of the host.

As described above, speaker 12 is a headphone type speaker and is disposed in contact with the ear of the head of the host when hat 20 is worn on the head of the host; thus, a voice in a host's language is output only to the host. Therefore, this voice, which is not in a guest's language, is not easily heard by the guest. Further, microphone 11 is disposed near the mouth of the host when hat 20 is worn on the head of the host; thus, the host can speak to microphone 11 at a relatively low volume. Therefore, the voice of the host, which is not in the guest's language, is not easily heard by the guest. With this arrangement, it is possible to reduce the confusion of the guest caused by the voices in the guest's language and the voices in the host's language flying between the host and the guest.

On the other hand, microphone 21, speaker 22, and display 23 for a guest are provided on an upper front surface of hat 20.

Further, inside hat 20 are provided control module 30 and vibrator 40. Control module 30 has a communication function as described later and is connected to translation server 100 via internet 200. Translation device 10 also includes operation module 50. Operation module 50 has host-use speech button 51, guest-use speech button 52, and language selection button 53.

Translation device 10 is connected to translation server 100 via internet 200. Translation server 100 translates voice data in a character string received from translation device 10 to generate translation data in a character string. In addition, translation server 100 further generates an evaluation value of the translation. Further, translation server 100 reversely translates the translation data in a character string to generate reverse translation data in a character string. Translation server 100 transmits the translation data, the evaluation value of the translation data, and the reverse translation data to translation device 10 via internet 200. Hereinafter, an electric configuration of translation device 10 will be described in detail.

[1-1-2. Electric Configuration of Translation Device]

Figure 2:
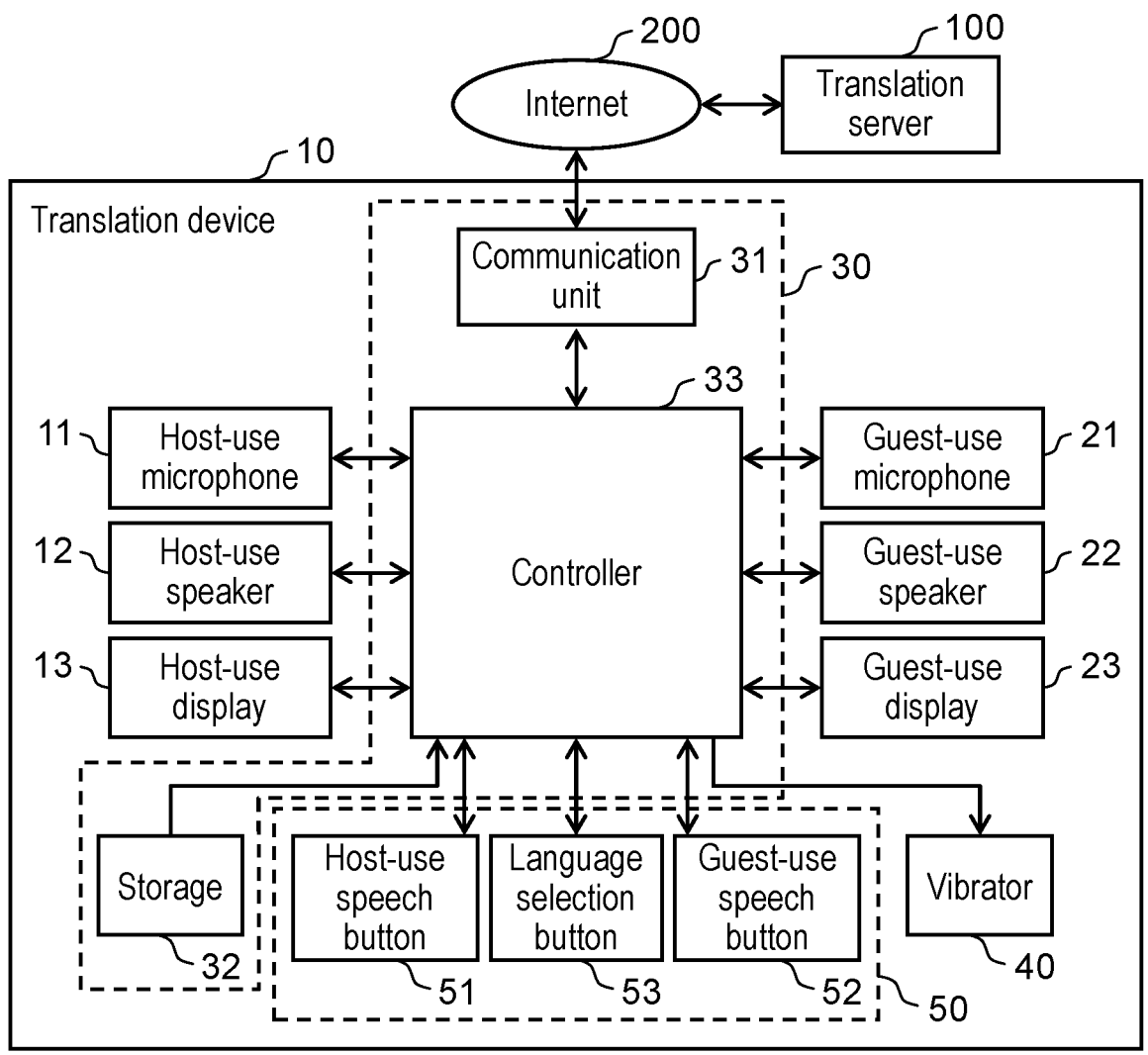
FIG. 2 is a block diagram showing an electric configuration of the translation device according to the first exemplary embodiment.

FIG. 2 is a block diagram showing an electric configuration of the translation device according to the first exemplary embodiment.

Translation device 10 includes control module 30, vibrator 40, and operation module 50. Control module 30 includes communication unit 31, storage 32, and controller 33. To control module 30 are connected microphone 11, speaker 12, and display 13 for a host and are connected microphone 21, speaker 22, and display 23 for a guest.

Microphone 11 is a device that converts a voice into an electric signal. Microphone 11 receives a host voice and converts the voice into an electric signal (voice signal).

Microphone 21 is a device that converts a voice into an electric signal. Microphone 21 receives a voice of a guest and converts the voice into an electric signal (voice signal).

Communication unit 31 is a communication module that performs data communication with translation server 100 via internet 200, by a communication method such as Bluetooth (registered trademark, the same applies hereinafter), Wi-Fi, 3G, LTE, or IEEE 802.11. Communication unit 31 transmits voice data, the kind of language of the voice data, and the kind of a target translation language to translation server 100 via internet 200.

Storage 32 is a storage device configured with a flash memory, a ferroelectric memory, a hard disk drive (HDD), a solid state drive (SSD), or the like. Storage 32 stores a reference table for voice recognition and voice synthesis for each of a plurality of languages. The reference table for voice recognition is a table in which character data and voice signals based on the character data are put in correspondence to each other. The reference table for voice synthesis is a table in which character data and features of voice signals based on the character data are put in correspondence to each other. Further, storage 32 stores various programs for controller 33.

Controller 33 is configured with a central processing unit (CPU), a micro processing unit (MPU), and the like, and the various programs stored in storage 32 are executed to totally control translation device 10. Controller 33 includes an A/D converter and a D/A converter. Controller 33 converts a voice signal having been input from host-use microphone 11 into digital voice data and further performs voice recognition to generate first voice data in a character string. Further, controller 33 converts a voice signal having been input from guest-use microphone 21 into digital voice data and further performs voice recognition to generate second voice data in a character string.

Controller 33 transmits the first and second voice data, the kinds of the languages of the voice data, and the kinds of the target translation languages to translation server 100 via communication unit 31.

Further, controller 33 receives, from translation server 100 via communication unit 31, first translation data that is a translation of the first voice data, an evaluation value of the translation, second translation data that is a translation of the second voice data, and an evaluation value of the translation.

Controller 33 performs voice synthesis on the first translation data to generate a voice signal and causes speaker 22 to output the voice.

Further, controller 33 performs voice synthesis on the second translation data to generate a voice signal and causes speaker 12 to output the voice. Further, controller 33 presents the evaluation value of the translation to the host by controlling vibrator 40, depending on the evaluation value of the translation (for example, when the evaluation value is not greater than a predetermined threshold).

Further, controller 33 receives, from translation server 100 via communication unit 31, first reverse translation data and second reverse translation data that are respectively reverse translations of the first translation data and the second translation data. Controller 33 generates a character image for displaying the first reverse translation data and displays the character image by controlling host-use display 13. Further, controller 33 generates a character image for displaying the second reverse translation data and displays the character image by controlling guest-use control display 23.

Note that a function of controller 33 is realized by the hardware and the software cooperating with each other; however, it is also possible to realize only with a hardware circuit specifically designed to realize a predetermined function. For example, controller 33 can be configured not only with the CPU and the MPU but with a digital signal processor (DSP), a field programmable gate array (FPGA), an application specific integrated circuit (ASIC), or the like.

Host-use speaker 12 is a device that converts an electric signal into a voice. Speaker 12 outputs a voice based on the electric signal (voice signal) from controller 33.

Guest-use speaker 22 is a device that converts an electric signal into a voice. Speaker 22 outputs a voice based on the electric signal (voice signal) from controller 33.

Host-use display 13 is a device that displays an image. Display 13 displays the character image represented by the first reverse translation data from controller 33. This configuration enables the host to check whether the translation result is correct, on the basis of consistency between the spoken voice and the reverse translation result. Further, display 13 displays the evaluation values of the first and second translation data from controller 33. The host can see correctness of the first and second translation data by using display 13. Display 13 is an example of a first display unit that displays the first reverse translation data to the host.

Guest-use display 23 is a device that displays an image. Display 23 displays the character image represented by the second reverse translation data from controller 33. This configuration enables the guest to check whether the translation result is correct, on the basis of consistency between the voice spoken by the guest and the reverse translation result. Display 23 is an example of a second display unit that displays the second reverse translation data to the guest. Further, guest-use display 23 does not display the evaluation values of the first and second translation data.

Vibrator 40 vibrates under control of controller 33. By this vibration, vibrator 40 presents the evaluation value of the translation to the host. Vibrator 40 is an example of an evaluation presentation unit that presents the evaluation value of the translation to the host.

Operation module 50 includes some types of operation buttons such as host-use speech button 51, guest-use speech button 52, and language selection button 53. Speech button 51 is an operation button to activate host-use microphone 11. Speech button 52 is an operation button to activate guest-use microphone 21. Language selection button 53 is an operation button to select the translation from Japanese to English, the translation from English to Japanese, and the like. Operation module 50 communicates with controller 33 by wire or radio, being compliant with a near field communication standard such as Bluetooth or Wi-Fi.

[1-2. Operation]

Figure 3:
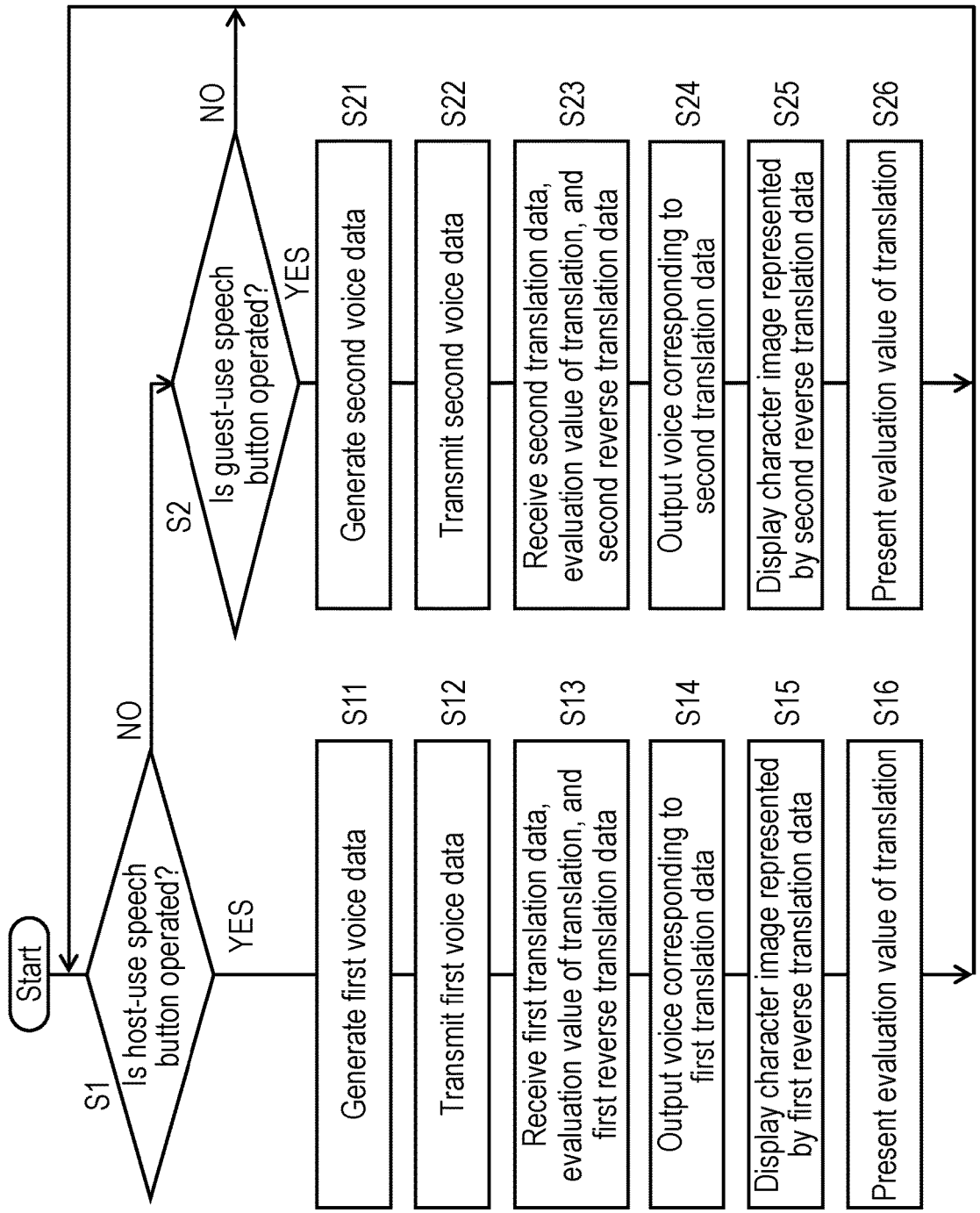
FIG. 3 is a flowchart showing an operation of translation by a controller of the translation device according to the first exemplary embodiment.

An operation of translation device 10 configured as described above will be described below. FIG. 3 is a flowchart showing an operation of translation by controller 33 of translation device 10.

In the present exemplary embodiment, when a host wants to talk, the host operates language selection button 53 to select a translation language (for example, the translation from Japanese to English) and then operates speech button 51. On the other hand, when the host finishes talking or when the host wants to hear what the guest talks, the host operates language selection button 53 to select a translation language (for example, the translation from English to Japanese) and then operates speech button 52.

With reference to FIG. 3, controller 33 determines whether speech button 51 is operated by the host (step S1). If speech button 51 is not operated (step S1: NO), controller 33 next determines whether speech button 52 is operated by the host (step S2). If the operation on speech button 52 is not performed either (step S2: NO), controller 33 goes back to step S1.

If host-use speech button 51 is operated by the host (step S1: YES), controller 33 activates microphone 11. At this time, when a voice of the host is input to microphone 11, microphone 11 generates a voice signal corresponding to the voice of the host. Controller 33 receives the voice signal from microphone 11 and performs voice recognition to generated first voice data (step S11). Specifically, controller 33 generates the first voice data in a character string from the voice signal by referring to the reference table for voice recognition. In the present exemplary embodiment, the voice recognition function of controller 33 and microphone 11 are an example of a first receiver.

Next, controller 33 transmits the first voice data to translation server 100 via communication unit 31 and internet 200 (step S12). Translation server 100 translates the received first voice data to generate the first translation data in a character string and generates the evaluation value of this translation. Specifically, translation server 100 generates the first translation data corresponding to the first voice data by referring to a Japanese to English translation dictionary. Further, translation server 100 generates the evaluation value of this translation. The evaluation value is information indicating the accuracy of the translation result. As methods of translation and calculating an evaluation value of translation, a known method such as BLEU (BiLingual Evaluation Understudy) or RIBES (Rank-based Intuitive Bilingual Evaluation Score) is used.

Further, translation server 100 reversely translates the first translation data into the language (Japanese) before the translation so as to generate first reverse translation data in a character string. Specifically, translation server 100 generates the first reverse translation data corresponding to the first translation data by referring to an English to Japanese translation dictionary stored in a memory or the like.

Next, controller 33 receives the first translation data, the evaluation value of the translation, and the first reverse translation data from translation server 100 via internet 200 and communication unit 31 (step S13).

Next, controller 33 performs voice synthesis on the first translation data to generate a voice signal and causes guest-use speaker 22 to output a voice corresponding to the voice signal (step S14). Specifically, controller 33 converts the first translation data in a character string into the voice signal, by referring to a reference table for English voice synthesis. The voice signal is converted into a voice and is output by speaker 22. In the present exemplary embodiment, the voice synthesis function of controller 33 and speaker 22 are an example of a second output unit.

Next, controller 33 generates a character image for displaying the first reverse translation data and causes host-use display 13 to display the character image (step S15). Further, controller 33 presents the evaluation value of the translation to the host by causing vibrator 40 to operate, depending on the evaluation value of the translation (for example, when the evaluation value is not greater than a predetermined threshold) (step S16). The above display and presentation enable the host to check whether the translation was performed correctly. Then, the process goes back to step S1.

On the other hand, if guest-use speech button 52 is operated by the host (step S2: YES), controller 33 activates microphone 21. At this time, when a voice of the guest is input to microphone 21, microphone 21 generates a voice signal corresponding to the voice of the guest. Controller 33 receives the voice signal from microphone 21 and performs voice recognition to generate second voice data (step S21). Specifically, controller 33 generates the second voice data in a character string from the voice signal by referring to the reference table for voice recognition. In the present exemplary embodiment, the voice recognition function of controller 33 and microphone 21 are an example of a second receiver.

Next, controller 33 transmits the second voice data to translation server 100 via communication unit 31 and internet 200 (step S22). Translation server 100 translates the received second voice data to generate the second translation data in a character string and generates the evaluation value of this translation. Specifically, translation server 100 generates the second translation data corresponding to the second voice data by referring to the English to Japanese translation dictionary. Further, translation server 100 generates the evaluation value of this translation.

Further, translation server 100 reversely translates the second translation data into the language (English) before the translation so as to generate second reverse translation data in a character string. Specifically, translation server 100 generates the second reverse translation data corresponding to the second translation data by referring to the Japanese to English translation dictionary stored in a memory or the like.

Next, controller 33 receives the second translation data, the evaluation value of the translation, and the second reverse translation data from translation server 100 via internet 200 and communication unit 31 (step S23).

Next, controller 33 performs voice synthesis on the second translation data to generate a voice signal and causes host-use speaker 12 to output a voice corresponding to the voice signal (step S24). Specifically, controller 33 converts the second translation data in a character string into the voice signal, by referring to a reference table for Japanese voice synthesis. The voice signal is converted into a voice and is output by speaker 12. In the present exemplary embodiment, the voice synthesis function of controller 33 and speaker 12 are an example of a first output unit.

Next, controller 33 generates a character image for displaying the second reverse translation data and causes guest-use display 23 to display the character image (step S25). This display enables the guest to check whether the translation is performed correctly. Further, controller 33 presents the evaluation value of the translation to the host by causing vibrator 40 to operate, depending on the evaluation value of the translation (for example, when the evaluation value is not greater than a predetermined threshold) (step S26). This presentation enables the host to check whether the translation was performed correctly. Then, the process goes back to step S1.

In the above operation, host-use speaker 12 is a headphone type speaker and is disposed in contact with the ear of the head of the host when hat 20 is worn on the head of the host; thus, the voice in the host's language is output only to the host. Therefore, this voice, which is not in the guest's language, is not easily heard by the guest. Further, since host-use microphone 11 constitutes a headset and is disposed near the mouth of the host when hat 20 is worn on the head of the host; thus, the host can speak to microphone 11 at a relatively low volume. Therefore, the voice of the host, which is not in the guest's language, is not easily heard by the guest. With this configuration, it is possible to reduce the confusion of the guest caused by the voice in the guest's language and the voice in the host's language flying between the host and the guest.

Further, with translation device 10 of the present exemplary embodiment, it is possible to translate the bilateral conversation between a host and a guest, with a single translation device. Further, translation device 10 of the present exemplary embodiment is used while being worn by the host. Further, host-use speech button 51 and guest-use speech button 52 on operation module 50 are operated by the host. This configuration provides an advantage that a guest, who is inexperienced with the operation of the translation device, can translate the bilateral conversation between the host and the guest without operating the translation device. This advantage will be described below in detail.

With reference to FIG. 4 and FIG. 5, a comparison will be made between hat type translation device 10 of the present exemplary embodiment capable of translating a bilateral conversation and glass type translation device 10X that translates a one-way conversation as disclosed in PTL 1. FIG. 4 is a diagram for describing an example of how a conventional glass type translation device for translating a one-way conversation is worn and used. FIG. 5 is a diagram for describing an example of how a hat type translation device of the present exemplary embodiment capable of translating a bilateral conversation is worn and used.

As shown in FIG. 4, in the case of glass type translation device 10X for translating a one-way conversation, in order to translate a bilateral conversation between a host and a guest, both the host and the guest have to wear glass type translation device 10X, and both the host and the guest have to operate operation module 50X.

For example, the host operates a speech button of operation module 50X to activate the microphone and emits a voice "Irasshaimase (Japanese)". Translation device 10X worn on and used by the host translates the emitted voice and emits a voice "Welcome (English)". Next, the guest operates the speech button of operation module 50X to activate the microphone and emits a voice "Where is the . . . ? (English)". Translation device 10X worn on and used by the guest translates the emitted voice and emits a voice " . . . wa dokodesuka? (Japanese)". Next, the host operates the speech button of the operation module 50X to activate the microphone and emits a voice " . . . desu (Japanese)". Translation device 10X worn on and used by the host translates the emitted voice and emits a voice "There is . . . . (English)". In this case, the host is well-experienced with the operation of translation device 10X, but the guest operates translation device 10X for the first time; therefore, there is a problem that it is difficult for the guest to operate the device.

In contrast, in the case of hat type translation device 10 of the present exemplary embodiment capable of translating a bilateral conversation, for example, as shown in FIG. 5, the host operates host-use speech button 51 of operation module 50 to activate microphone 11 and emits a voice "Irasshaim-ase (Japanese)". Translation device 10 worn on and used by the host translates the emitted voice and outputs a voice "Welcome (English)" to the guest. Next, the host operates speech button 52 of operation module 50 to activate microphone 21. At this time, the guest emits a voice "Where is the . . . ? (English)". Then, translation device 10 worn on and used by the host translates the emitted voice and outputs a voice " . . . wa dokodesuka? (Japanese)" to the host. Next, the host operates speech button 51 of operation module 50 to activate microphone 11 and emit a voice " . . . desu (Japanese)". Translation device 10 worn on and used by the host translates the emitted voice and emits a voice "There is . . . . (English)" to the guest.

As described above, hat type translation device 10 of the present exemplary embodiment capable of translating a bilateral conversation is used while being worn by the host, and speech button 51 and speech button 52 of operation module 50 are both operated by the host. This configuration achieves the translation of the bilateral conversation between the host and the guest, without causing the guest who is inexperienced with the operation of the translation device to operate the translation device.

Further, in FIG. 4 and FIG. 5, the languages flying between the host and the guest are represented by thick line speech bubbles, and the languages in relatively low volumes are represented by dotted line speech bubbles. As shown in FIG. 4, in the case of conventional translation device 10X, voices in the guest's language and voices in the host's language are flying between the host and the guest. However, as shown in FIG. 5, in the case of translation device 10 of the present exemplary embodiment, only voices in the guest's language are flying between the host and the guest.

[1-3. Effects and Other Benefits]

As described above, in the present exemplary embodiment, translation device 10 is a translation device that is used while being worn by the host and translates a conversation between the host and the guest, and translation device 10 includes microphone 11, speaker 12 for the host and microphone 21, speaker 22 for the guest. Microphone 11 receives the voice of the host and generates the first voice data corresponding to the voice of the host. Speaker 12 outputs, to the host, the voice corresponding to the second translation data generated by translating the second voice data. Microphone 21 receives the voice of the guest and generates the second voice data corresponding to the voice of the guest. Speaker 22 outputs, to the guest, the voice corresponding to the first translation data generated by translating the first voice data.

Thus, in the case of translation device 10, only one translation device can translate the bilateral conversation between the host and the guest.

Further, host-use speaker 12 outputs, to near the ear of the host, the voice in which the guest's language (for example, English) is translated into the host's language (for example, Japanese). Thus, the voice in the host's language from speaker 12 is not easily heard by the guest. Further, translation device 10 is used while being worn by the host; thus, the host can speak at a relatively low volume to host-use microphone 11. Thus, the voice spoken by the host in the host's language is not easily heard by the guest. With this configuration, it is possible to reduce the confusion of the guest caused by the voice in the guest's language and the voice in the host's language flying between the host and the guest.

Second Exemplary Embodiment

In the first exemplary embodiment, translation is performed by translation server 100 connected to translation device 10 via internet 200. In a second exemplary embodiment, translation device 10 itself performs translation processing.

Figure 6:
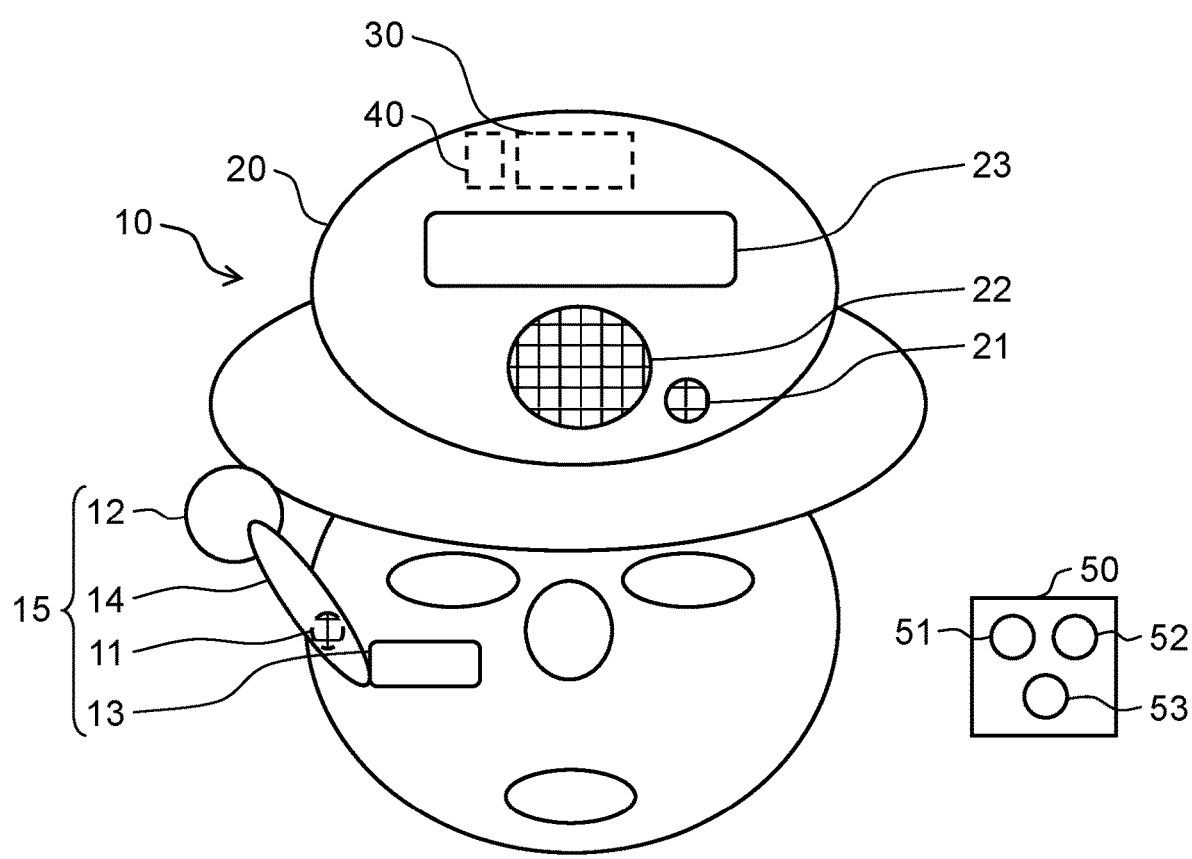
FIG. 6 is a diagram showing an outer appearance of a translation device according to a second exemplary embodiment.
Figure 7:
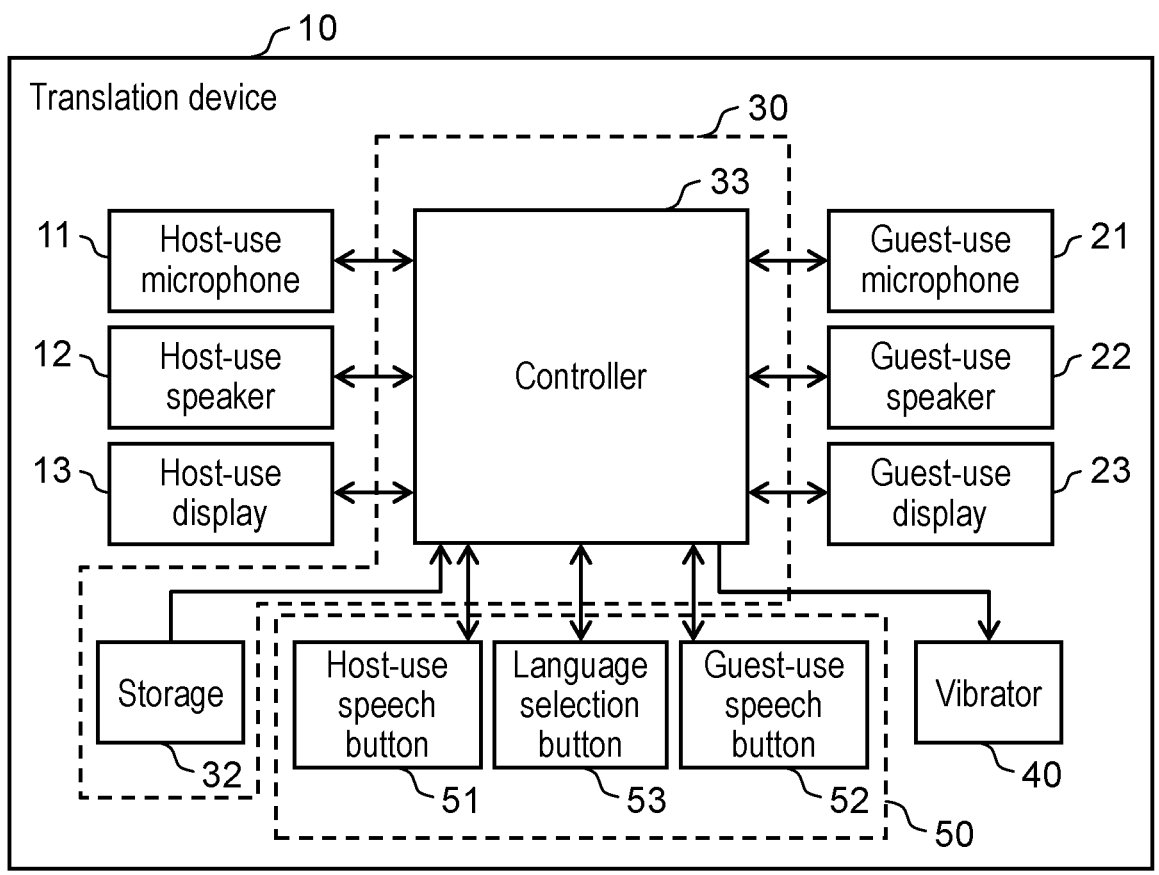
FIG. 7 is a block diagram showing an electric configuration of the translation device according to the second exemplary embodiment.

FIG. 6 is a diagram showing an outer appearance of a translation device according to the second exemplary embodiment, and FIG. 7 is a block diagram showing an electric configuration of the translation device according to the second exemplary embodiment. As shown in FIG. 6 and FIG. 7, translation device 10 of the second exemplary embodiment is different from translation device 10 of the first exemplary embodiment shown in FIG. 1 and FIG. 2 in that translation device 10 of the second exemplary embodiment does not include communication unit 31 and does not communicate with translation server 100. Further, translation device 10 of the second exemplary embodiment is different from translation device 10 of the first exemplary embodiment in that storage 32 stores a plurality of translation dictionaries separately for each kind of language translation (for example, Japanese to English language translation and English to Japanese language translation). Each translation dictionary is a dictionary in which voice data in a character string (text) and translation data in a character string are put in correspondence to each other.

Figure 8:
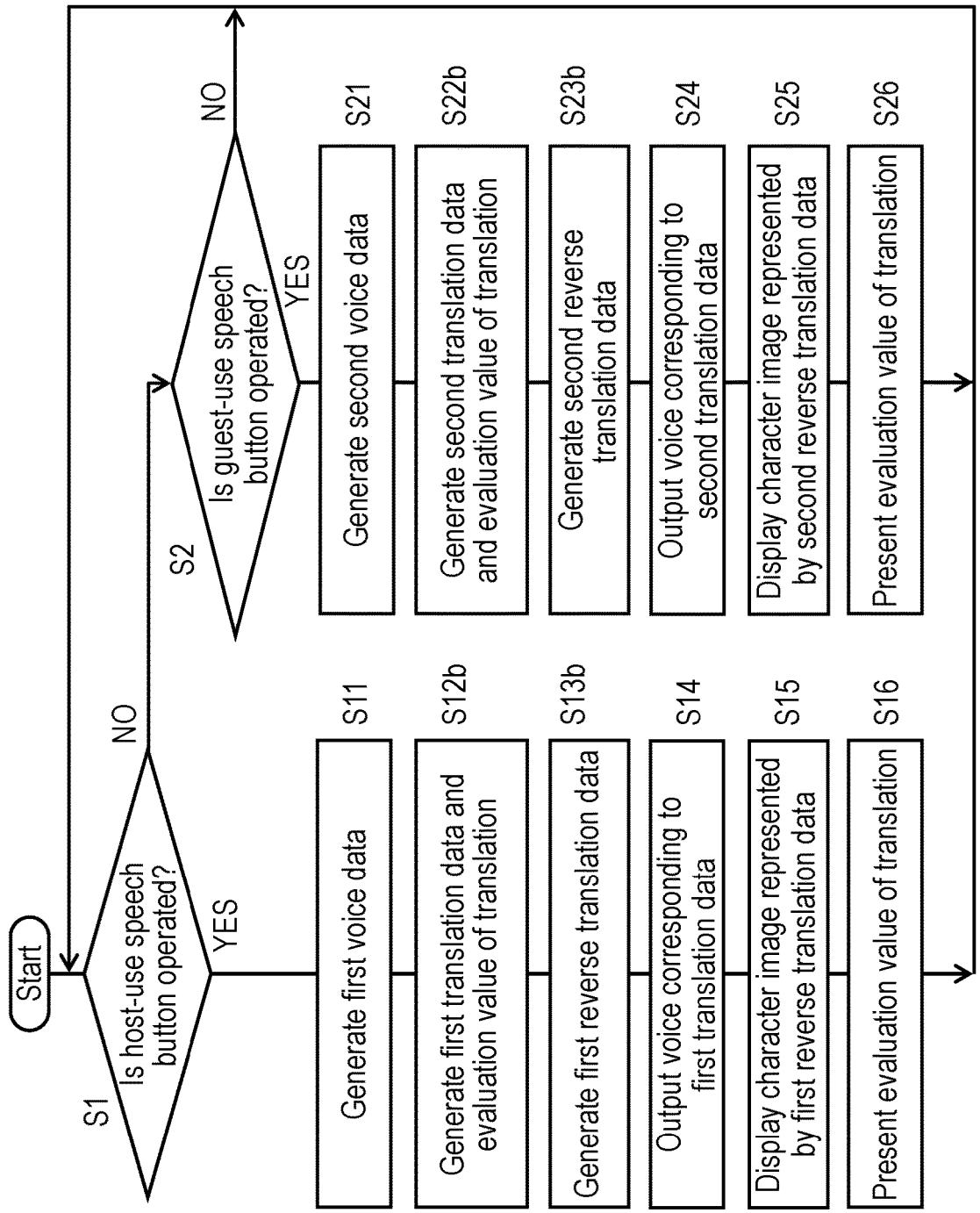
FIG. 8 is a flowchart showing an operation of translation by a controller of the translation device according to the second exemplary embodiment.

Hereinafter, with reference to FIG. 8, translation device 10 according to the second exemplary embodiment will be described. FIG. 8 is a flowchart showing an operation of translation by translation device 10 according to the second exemplary embodiment.

Similar to the first exemplary embodiment, controller 33 determines in step S1 whether host-use speech button 51 is operated by a host. Further, in step S2, controller 33 determines whether guest-use speech button 52 is operated by the host.

If host-use speech button 51 is operated by the host (step S1: YES), controller 33 activates microphone 11. At this time, when a voice of the host is input to microphone 11, microphone 11 generates a voice signal corresponding to the voice of the host. Controller 33 receives the voice signal from microphone 11 and performs voice recognition to generated first voice data (step S11).

Next, controller 33 translates the received first voice data to generate first translation data in a character string and generates an evaluation value of the translation (step S12*b*). Specifically, controller 33 generates the first translation data corresponding to the first voice data by referring to the Japanese to English translation dictionary stored in storage 32. Further, controller 33 generates the evaluation value of the translation.

Next, controller 33 reversely translates the first translation data into the language (Japanese) before the translation so as to generate first reverse translation data in a character string (step S13*b*). Specifically, controller 33 generates the first reverse translation data corresponding to the first translation data by referring to the English to Japanese translation dictionary stored in storage 32.

Next, controller 33 performs voice synthesis on the first translation data to generate a voice signal and causes guest-use speaker 22 to output a voice corresponding to the voice signal (step S14). Next, controller 33 generates a character image for displaying the first reverse translation data and causes host-use display 13 to display the character image (step S15). Further, controller 33 presents the evaluation value of the translation to the host by causing vibrator 40 to operate, depending on the evaluation value of the translation (for example, when the evaluation value is not greater than a predetermined threshold) (step S16).

On the other hand, if guest-use speech button 52 is operated by the host (step S2: YES), controller 33 activates microphone 21. At this time, when a voice of a guest is input to microphone 21, microphone 21 generates a voice signal corresponding to the voice of the guest. Controller 33 receives the voice signal from microphone 21 and performs voice recognition to generate second voice data (step S21).

Next, controller 33 translates the second voice data to generate second translation data in a character string and generates the evaluation value of the translation (step S22b). Specifically, controller 33 generates the second translation data corresponding to the second voice data by referring to the English to Japanese translation dictionary stored in storage 32. Further, controller 33 generates the evaluation value of the translation.

Next, controller 33 reversely translates the second translation data into the language (English) before the translation so as to generate second reverse translation data in a character string (step S23b). Specifically, controller 33 generates the second reverse translation data corresponding to the second translation data by referring to the Japanese to English translation dictionary stored in storage 32.

Next, controller 33 performs voice synthesis on the second translation data to generate a voice signal and causes host-use speaker 12 to output a voice corresponding to the voice signal (step S24). Next, controller 33 generates a character image for displaying the second reverse translation data and causes guest-use display 23 to display the character image (step S25). Further, controller 33 presents the evaluation value of the translation to the host by causing vibrator 40 to operate, depending on the evaluation value of the translation (for example, when the evaluation value is not greater than a predetermined threshold) (step S26).

Also with translation device 10 of this second exemplary embodiment, it is possible to provide an advantage similar to the advantage of translation device 10 of the first exemplary embodiment.

Third Exemplary Embodiment

Hereinafter, with reference to FIG. 9 to FIG. 14, a third exemplary embodiment will be described. Similar to the first or second exemplary embodiment, in the present exemplary embodiment, for convenience of description, a description will be given assuming that a translation device is used while being worn by a host (guide) (first user) guiding a guest (traveler) (second user) from abroad.

In the case of the translation device according to the first or second exemplary embodiment, even when the guest speaks while the host-use speech button is being operated, the voice of the guest is not translated.

A translation device of the present exemplary embodiment includes, in addition to the functions of the first or second exemplary embodiment, a simultaneous speech countermeasure function that addresses when the guest and the host simultaneously speak. A specific example is a function that preferentially translates the speech of the guest when the guest speaks while the host is speaking. The translation device of the present exemplary embodiment has a host mode and a guest mode. The host mode is a mode in which the host mainly speaks. The guest mode is a mode in which the guest mainly speaks.

[2-1. Configuration]

[2-1-1. Physical Configuration of Translation Device]

A physical configuration of the translation device according to the present exemplary embodiment is the same as the physical configuration of the first or second exemplary embodiment except the following points.

Hereinafter, characteristic points of the third exemplary embodiment will be described.

Figure 9:
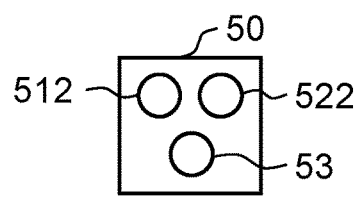
FIG. 9 is a diagram showing an operation module of a translation device according to a third exemplary embodiment.

As shown in FIG. 9, operation module 50 has host mode switching button 51₂ instead of host-use speech button 51. Further, operation module 50 has guest mode switching button 52₂ instead of guest-use speech button 52.

Operation module 50 may have, in addition to these buttons, a simultaneous speech countermeasure button (not shown) that is used to switch on/off of the simultaneous speech countermeasure function to be described later. Note that when the simultaneous speech countermeasure function is off, translation device 10 according to the present exemplary embodiment performs the same operation as the operation in the translation device according to the first or second exemplary embodiment. If operation module 50 does not have a simultaneous speech countermeasure button, long-press of another button or simultaneous press of a plurality of buttons can be alternatively used. In the present exemplary embodiment, host mode switching button 51₂ and language selection button 53 are simultaneously pressed to switch on/off the simultaneous speech countermeasure function.

[2-1-2. Electric Configuration of Translation Device]

An electric configuration of the translation device according to the present exemplary embodiment is the same as the electric configuration of the first or second exemplary embodiment except the following points. Hereinafter, the characteristic points of the third exemplary embodiment will be described.

Controller 33 controls the simultaneous speech countermeasure function in addition to the control in the first or second exemplary embodiment. The simultaneous speech countermeasure function is a function that preferentially translates the speech of the guest when the host and the guest simultaneously speak. Details will be described later.

Operation module 50 includes some types of operation buttons such as host mode switching button 51₂, guest mode switching button 52₂, and language selection button 53. Host mode switching button 51₂ is an operation button for the host to speak. Guest mode switching button 52₂ is an operation button for the host to speak. Language selection button 53 is an operation button to select the translation from Japanese to English, the translation from English to Japanese, and the like. Operation module 50 communicates with controller 33 by wire or radio, being compliant with a near field communication standard such as Bluetooth or Wi-Fi.

[2-2. Operation]

An operation of translation device 10 configured as described above will be described below.

As described above, translation device 10 of the present exemplary embodiment has a host mode and a guest mode. The host switches between the host mode and the guest mode, depending on the situation. In the present exemplary embodiment, when the host wants to speak, the host operates host mode switching button 51₂ to switch to the host mode. On the other hand, when the host finishes speaking or the host wants to listen to the talk of the guest, the host operates the guest mode switching button 522 to switch to the guest mode.

The operation of translation device 10 according to the present exemplary embodiment in the guest mode is similar to the operation when guest-use speech button 52 in the first or second exemplary embodiment is operated.

Further, in the above-described way, the host can switch on/off the simultaneous speech countermeasure function at any time. The simultaneous speech countermeasure function is a function that preferentially translates the speech of the guest when the guest speaks while the host is speaking in the host mode.

Figure 10:
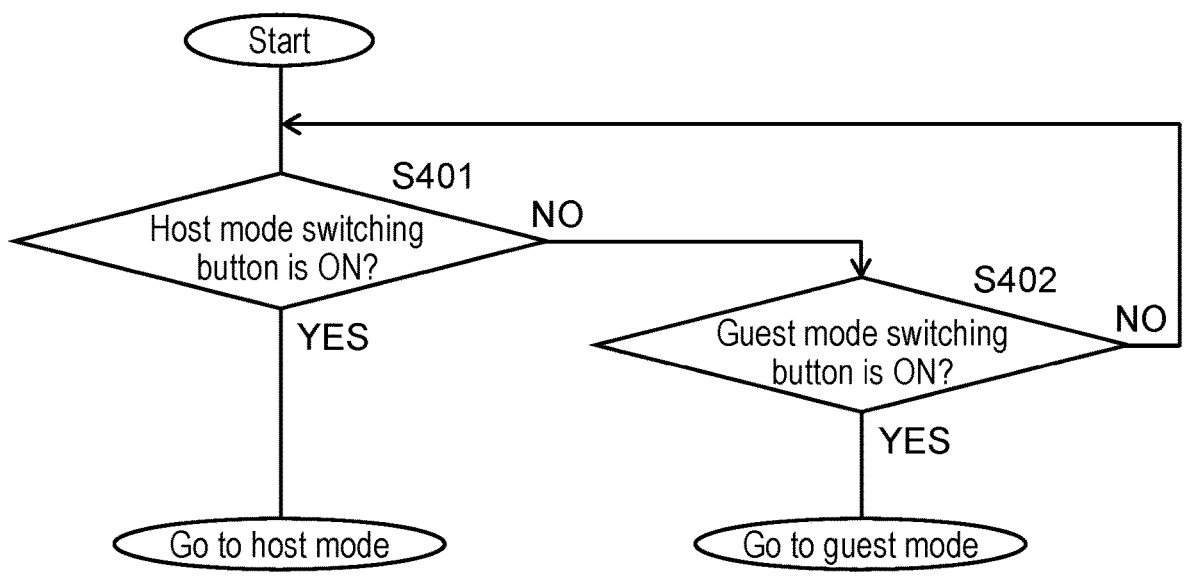
FIG. 10 is a flowchart showing how a controller of a translation device according to the third exemplary embodiment determines a mode.

Controller 33 determines which mode the mode is, the host mode or the guest mode, following the flowchart of FIG. 10. First, controller 33 determines whether host mode switching button 512 is operated (step S401). If host mode switching button 512 is operated (step S401: YES), controller 33 starts the host mode. If host mode switching button 512 is not operated (step S401: NO), controller 33 determines whether guest mode switching button 522 is operated (step S402). If guest mode switching button 522 is operated (step S402: YES), controller 33 starts the guest mode. If guest mode switching button 522 is not operated (step S402: NO), controller 33 performs the operation of step S401 again.

Controller 33 determines which mode the mode is, the host mode or the guest mode, at the following points of time, for example: when a power is turned on; when the series of operations in the host mode is finished; when the series of operations in the guest mode is finished; when host mode switching button 512 is operated; when host mode switching button 512 is operated; and the like. Controller 33 may determine which mode the mode is, the host mode or the guest mode, also at other points of time than the above. If the mode is determined to be the host mode, controller 33 starts a basic operation in the host mode. If the mode is determined to be the guest mode, controller 33 starts a basic operation (steps S21 to S26 in the first exemplary embodiment) in the guest mode.

Figure 11:
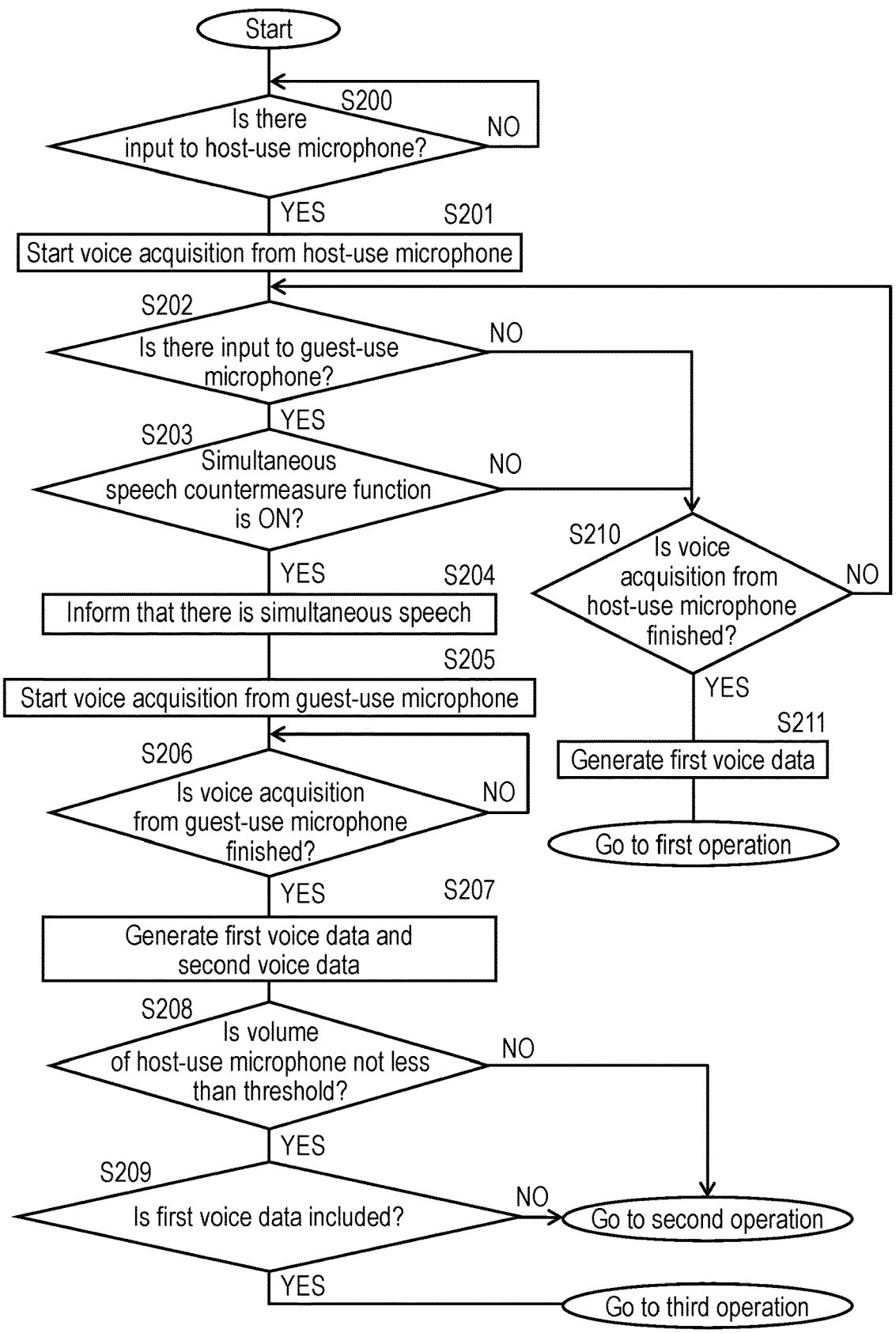
FIG. 11 is a flowchart showing a basic operation in a host mode by the controller of the translation device according to the third exemplary embodiment.
Figure 12:
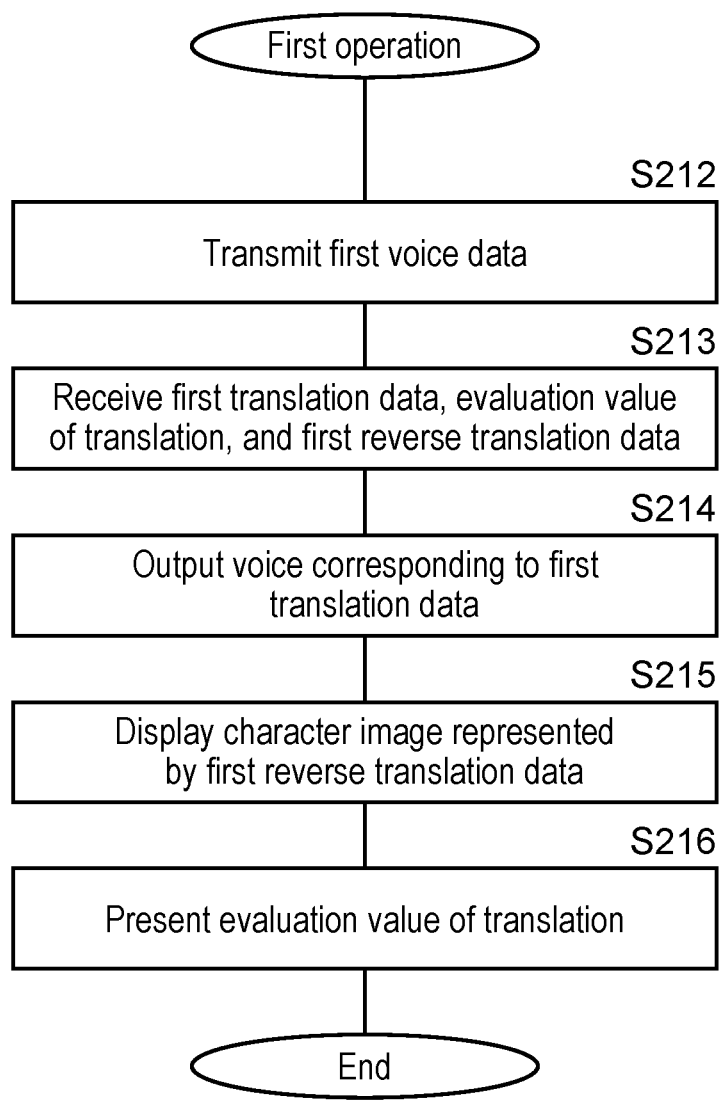
FIG. 12 is a flowchart showing a first operation in the host mode by the controller of the translation device according to the third exemplary embodiment.
Figure 13:
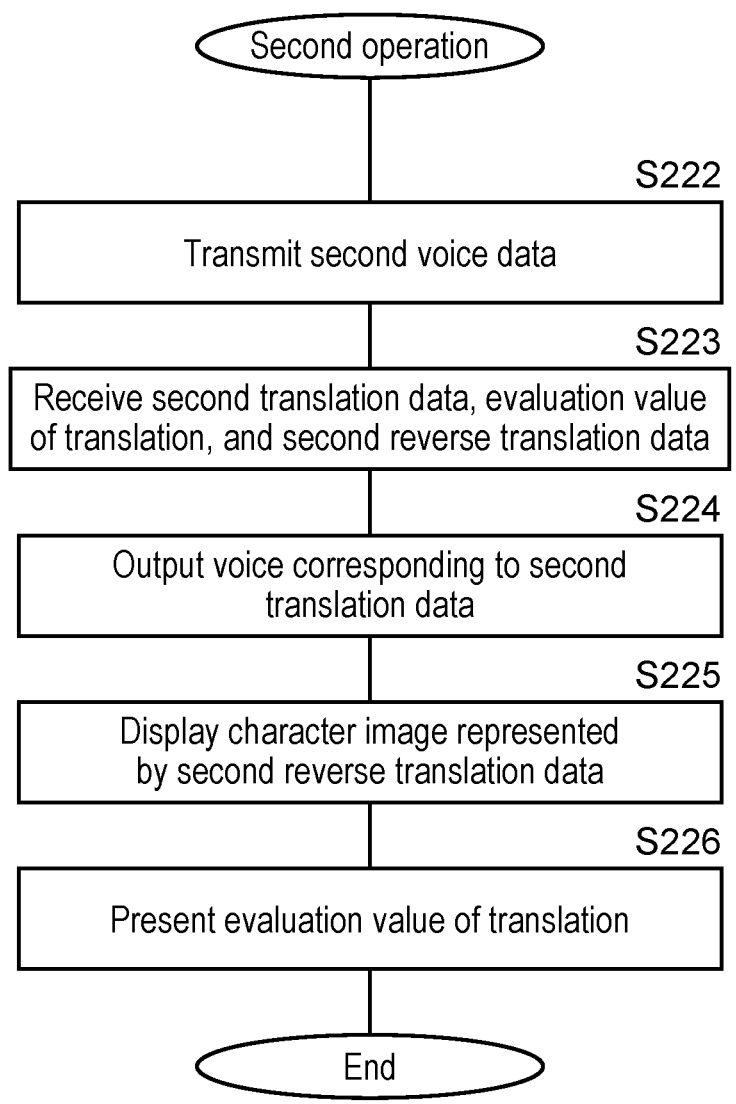
FIG. 13 is a flowchart showing a second operation in the host mode by the controller of the translation device according to the third exemplary embodiment.
Figure 14:
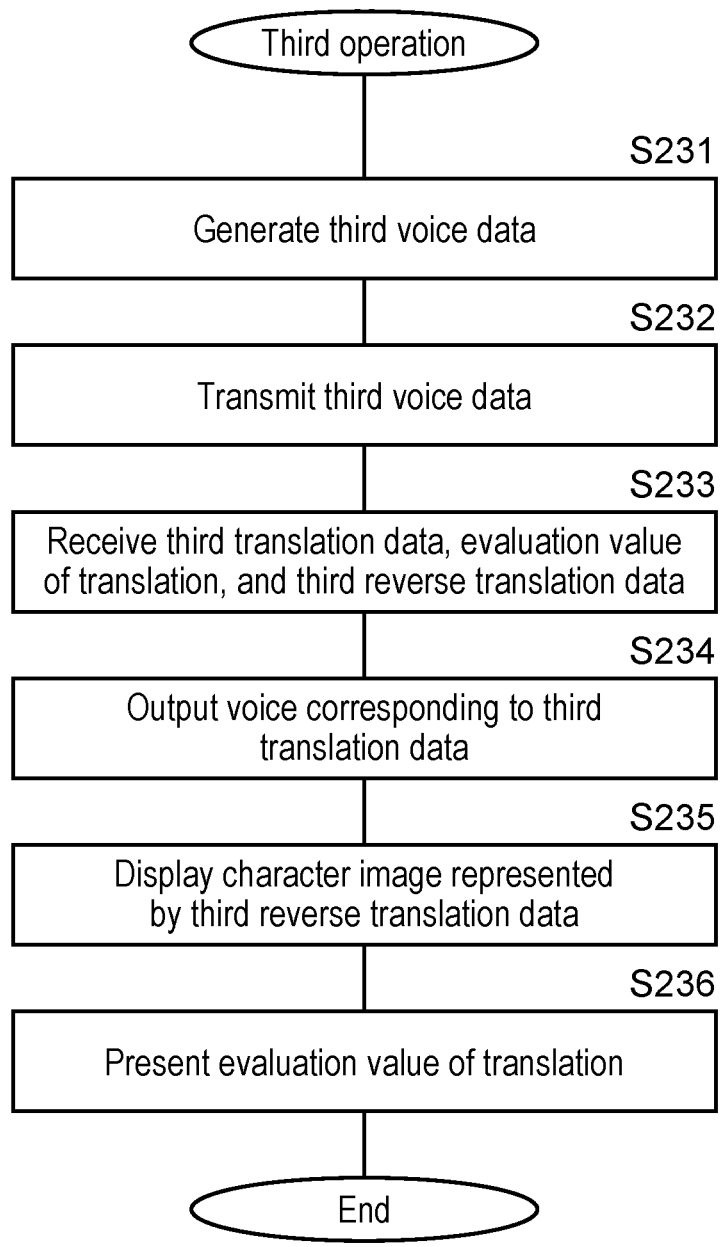
FIG. 14 is a flowchart showing a third operation in the host mode by the controller of the translation device according to the third exemplary embodiment.

The operation in the host mode will be described with reference to FIG. 11 to FIG. 14. FIG. 11 to FIG. 14 are flowcharts each showing the operation in the host mode. The operation in the host mode includes a basic operation, a first operation, a second operation, and a third operation. The basic operation shown FIG. 11 is an operation in which it is determined which of the first to third operations is to be performed in response to an input to host-use microphone 11. The first operation shown in FIG. 12 is an operation in which the input to host-use microphone 11 is translated. The second operation shown in FIG. 13 is an operation in which the input to guest-use microphone 21 is translated. The third operation shown in FIG. 14 is an operation in which translation is performed after subtracting the input to host-use microphone 11 from the input to guest-use microphone 21.

(Basic Operation in Host Mode)

When the basic operation in the host mode is started, controller 33 determines whether there is an input to host-use microphone 11 (step S200). If there is no input to host-use microphone 11 (step S200: NO), controller 33 waits until something is input. If there is an input to host-use microphone 11 (step S200: YES), host-use microphone 11 acquires a voice signal corresponding to a voice of the host. Controller 33 starts voice acquisition by using host-use microphone 11 (step S201).

Next, controller 33 determines whether there is an input to guest-use microphone 21 (step S202).

If there is no input to guest-use microphone 21 (step S202: NO), controller 33 determines whether the voice acquisition by using host-use microphone 11 is finished (step S210). For example, if there is no voice input to host-use microphone 11 for a predetermined time, controller 33 may determine that the voice acquisition is finished. In the present exemplary embodiment, if no voice is input to host-use microphone 11 for 2.0 seconds, controller 33 determines that the voice acquisition is finished. The method for determining whether voice acquisition is finished is not limited to the above method. Translation device 10 may further include a speech end button, and controller 33 may determine that voice acquisition is finished when the speech end button is operated. Other than this, translation device 10 may further include an image pickup apparatus to image a mouth of the host, and controller 33 may determine that voice acquisition is finished when the mouth stops moving.

If the voice acquisition by using host-use microphone 11 is not finished (step S210: NO), controller 33 again determines whether there is an input to guest-use microphone 21 (step S202). If the voice acquisition by using host-use microphone 11 is finished (step S210: YES), controller 33 generates the first voice data corresponding to the voice acquired from the host-use microphone (step S211). After that, controller 33 shifts to a host mode's first operation. The host mode's first operation is an operation in which the speech voice to host-use microphone 11 is translated and delivered to the guest as shown in FIG. 12. That is, steps S212 to S216 in the host mode's first operation are similar to steps S21 to S26 in the first exemplary embodiment. Therefore, the description of the host mode's first operation is omitted.

If there is an input to guest-use microphone 21 (step S202: YES), controller 33 determines whether the simultaneous speech countermeasure function is on (step S203). If the simultaneous speech countermeasure function is off (step S203: NO), controller 33 determines whether the voice acquisition by using host-use microphone 11 is finished (step S210).

If the simultaneous speech countermeasure function is on (step S203: YES), controller 33 informs the host that there is a simultaneous speech (step S204). Specifically, controller 33 informs the host that there is the simultaneous speech, in some way, for example, by causing vibrator 40 to operate or causing display 13 to display an image. That is, in step S204, for example, vibrator 40 (an example of a simultaneity indicator) or display 13 (another example of the simultaneity indicator) provides the host with the information that there is the simultaneous speech. Note that the way of informing the host is not limited to the above methods. When controller 33 makes vibrator 40 operate, it is preferable that controller 33 make vibrator 40 operate in a different vibration pattern from in the case of the vibration based on a translation evaluation to be described later. Specifically, an interval time of the vibration may be changed. Controller 33 may inform not only the host but also the guest that there is the simultaneous speech. Specifically, controller 33 may inform the guest that there is the simultaneous speech, in some way, for example, by causing display 23 to display an image.

Subsequently, guest-use microphone 21 starts acquiring the voice signal corresponding to the voice of the guest (step S205). Next, controller 33 determines whether the voice acquisition by using guest-use microphone 21 is finished (step S206). If the voice acquisition by using guest-use microphone 21 is not finished (step S206: NO), controller 33 again determines whether the voice acquisition by using guest-use microphone 21 is finished. If the voice acquisition by using guest-use microphone 21 is finished (step S206: YES), controller 33 generates the first voice data corresponding to the voice of the host and the second voice data corresponding to the voice of the guest (step S207).

Next, controller 33 determines whether an input volume on host-use microphone 11 was not less than a threshold (predetermined volume) (step S208). If the input volume on host-use microphone 11 was less than the threshold (step S208: NO), it is estimated that the voice emitted by the host hardly reached guest-use microphone 21. That is, it is estimated that the voice emitted by the guest accounts for most of the input to guest-use microphone 21. In this case, it is preferable that the input voice to guest-use microphone 21 be translated; therefore, controller 33 shifts to a host mode's second operation. The host mode's second operation is an operation in which the speech voice to guest-use microphone 21 is translated and delivered to the guest. The host mode's second operation will be described later. If the input volume on host-use microphone 11 is not less than a threshold (step S208: YES), it is estimated that the voice emitted by the host may have reached guest-use microphone 21.

If the determination in step S208 is YES, controller 33 determines whether the first voice data is included in the second voice data (step S209). Controller 33 determines whether the first voice data is included in the second voice data, by a method of, for example, waveform analysis. In order to determine whether the first voice data is included in the second voice data, it is also possible to compare voice ranges or the like by using waveform information of the guest previously obtained from the speech voice. Alternatively, determination may be made on the basis of the language used. Further, by mounting a plurality of directional microphones on guest-use microphone 21, determination can be made on the basis of the input direction of a voice.

If the first voice data is not included in the second voice data (step S209: NO), it is preferable to translate the voice having been input to microphone 21, and controller 33 therefore shifts to the host mode's second operation. The host mode's second operation will be described later. If the first voice data is included in the second voice data (step S209: YES), it is estimated that the voice emitted by the host may have reached microphone 21. Therefore, it is preferable to translate the voice obtained by subtracting the first voice data from the second voice data, and controller 33 shifts to a host mode's third operation. The host mode's third operation is an operation in which the voice obtained by subtracting the speech voice of host-use microphone 11 from the speech voice of guest-use microphone 21 is translated and delivered to the guest. The host mode's third operation will be described later.

Step S208 may be omitted. If step S208 is omitted, controller 33 proceeds to step S209 after step S207. Step S209 may be omitted. If step S209 is omitted, controller 33 proceeds to the third operation after step S208. Both of step S208 and step S209 may be omitted. If both of step S208 and step S209 are omitted, controller 33 proceeds to the third operation after step S207.

(Host Mode's Second Operation)

The host mode's second operation will be described below from here with reference to FIG. 13. The host mode's second operation is an operation in which, when the guest has interrupted the host mode, the speech voice of guest-use microphone 21 acquiring only the voice of the guest is translated and delivered to the guest.

If the host mode's second operation is started, controller 33 transmits the second voice data to translation server 100 via communication unit 31 and internet 200 (step S222). Translation server 100 translates the received second voice data to generate the second translation data in a character string and generates the evaluation value of this translation. The specific method of translation is similar to the method of the first or second exemplary embodiment.

Next, controller 33 receives the second translation data, the evaluation value of the translation, and the second reverse translation data from translation server 100 via internet 200 and communication unit 31 (step S223).

Next, controller 33 performs voice synthesis on the second translation data to generate a voice signal and outputs a voice corresponding to the voice signal from host-use speaker 12 (step S224). Specifically, controller 33 converts the second translation data in a character string into the voice signal, by referring to a reference table for English voice synthesis. This voice signal is converted into a voice by host-use speaker 12 and is output.

Next, controller 33 generates a character image for displaying the second reverse translation data and causes host-use display 13 to display the character image (step S225). Further, controller 33 presents the evaluation value of the translation to the host by causing vibrator 40 to operate, depending on the evaluation value of the translation (for example, when the evaluation value is not greater than a predetermined threshold) (step S226). The above display and presentation enable the host to check whether the translation was performed correctly. The vibration at this time is preferably made different from the above-described vibration for informing that there is a simultaneous speech. Specifically, an interval time of the vibration may be changed.

As described above, controller 33 finishes the host mode's second operation. Next, controller 33 determines which mode the mode is, the host mode or the guest mode, following the flowchart of FIG. 10. If the mode is determined to be the host mode, controller 33 starts the basic operation in the host mode. If the mode is determined to be the guest mode, controller 33 starts a basic operation in the guest mode.

(Host Mode's Third Operation)

The host mode's third operation will be described below from here with reference to FIG. 14 The host mode's third operation is an operation in which, when the guest has interrupted the host mode, the speech voice obtained by subtracting the speech voice of host-use microphone 11 from the speech voice of guest-use microphone 21 having acquired both the voice of the guest and the voice of the host is translated and delivered to the guest.

If the host mode's third operation is started, controller 33 performs voice processing for subtracting the first voice data from the second voice data. Specifically, controller 33 generates third voice data obtained by subtracting the first voice data from the second speech data (step S231). A period in which the voice processing is performed may be set to a period that satisfies the condition that an input volume on host-use microphone 11 is not less than a threshold and the first voice data is included in the second voice data.

Note that when subtracting the first voice data from the second voice data, controller 33 matches the time of each voice data. Controller 33 adds common time information based on a master clock to the first voice data and the second voice data when generating the first and second voice data, and matches the times by using the added time information. Alternatively, controller 33 may match the times by adding a tag indicating a "second start" to a time on the first voice data at which guest-use microphone 21 starts voice acquisition. Note that if controller 33 acquires also the second voice at the same time when controller 33 starts acquiring the first voice, it is also possible to perform subtraction while matching the start of the first voice data and the start of the second voice data.

The voice, of the speech of the host, received by guest-use microphone 21 is supposed to be smaller than the voice, of the host, received by host-use microphone 11. Therefore, at the time of subtraction, controller 33 preferably multiplies amplitude of the first voice data by constant A and subtracts the first voice data from the second voice data. That is, controller 33 preferably generates the third voice data by subtracting the amplitude obtained by multiplying the amplitude of the first voice data by constant A from the amplitude of the second voice data. Constant A is, for example, a real number greater than 0 and smaller than 1, without being limited thereto. The value of constant A depends on various causes such as the places of disposition and the directions of guest-use microphone 21 and host-use microphone 11, the performances of the microphones, and others. For the most appropriate subtraction, the value of constant A should be obtained through experiments. The most appropriate subtraction is a subtraction by which the voice reproduced from the third voice data becomes closest to the voice actually emitted by the guest. Alternatively, constant A may be determined on the basis of the distance between the host and the guest. Specifically, constant A may be determined on the basis of a mode (most frequent number) of the distance between the host and the guest. Alternatively, constant A may be determined on the basis of the ratio of the amplitude of the voice of the host to the amplitude of the voice of the guest. Specifically, constant A may be determined on the basis of the ratio of an average of the amplitude of the voice of the host to an average of the amplitude of the voice of the guest. By the above methods, constant A can be determined appropriately.

Controller 33 transmits the third voice data to translation server 100 via communication unit 31 and internet 200 (step S232). Translation server 100 translates the received third voice data to generate the third translation data in a character string and generates the evaluation value of this translation. The specific method of translation is similar to the method of the first or second exemplary embodiment.

Next, controller 33 receives the third translation data, the evaluation value of the translation, and the third reverse translation data from translation server 100 via internet 200 and communication unit 31 (step S233).

Next, controller 33 performs voice synthesis on the third translation data to generate a voice signal and outputs a voice corresponding to the voice signal from host-use speaker 12 (step S234). Specifically, controller 33 converts the third translation data in a character string into the voice signal, by referring to the reference table for English voice synthesis. This voice signal is converted into a voice by host-use speaker 12 and is output.

Next, controller 33 generates a character image for displaying the third reverse translation data and causes host-use display 13 to display the character image (step S235). Further, controller 33 presents the evaluation value of the translation to the host by causing vibrator 40 to operate, depending on the evaluation value of the translation (for example, when the evaluation value is not greater than a predetermined threshold) (step S236).

The above display and presentation enable the host to check whether the translation was performed correctly. The vibration at this time is preferably made different from the above-described vibration for informing that there is a simultaneous speech. Specifically, an interval time of the vibration may be changed.

As described above, controller 33 finishes the host mode's third operation. Controller 33 determines which mode the mode is, the host mode or the guest mode, following the flowchart of FIG. 10. If the mode is determined to be the host mode, controller 33 starts the basic operation in the host mode. If the mode is determined to be the guest mode, controller 33 starts the basic operation in the guest mode.

Fourth Exemplary Embodiment

Figure 15:
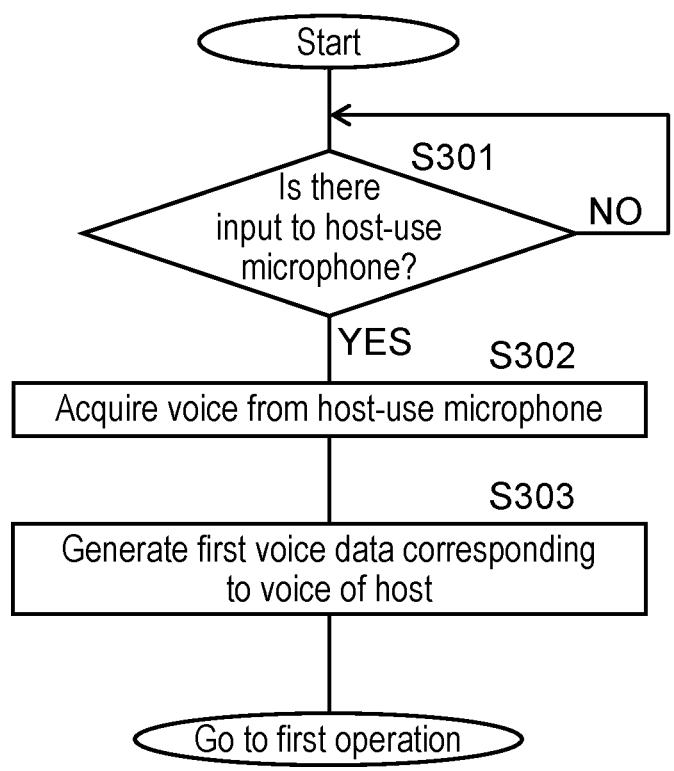
FIG. 15 is a flowchart showing a basic operation in a host mode by a controller of a translation device according to a fourth exemplary embodiment.
Figure 16:
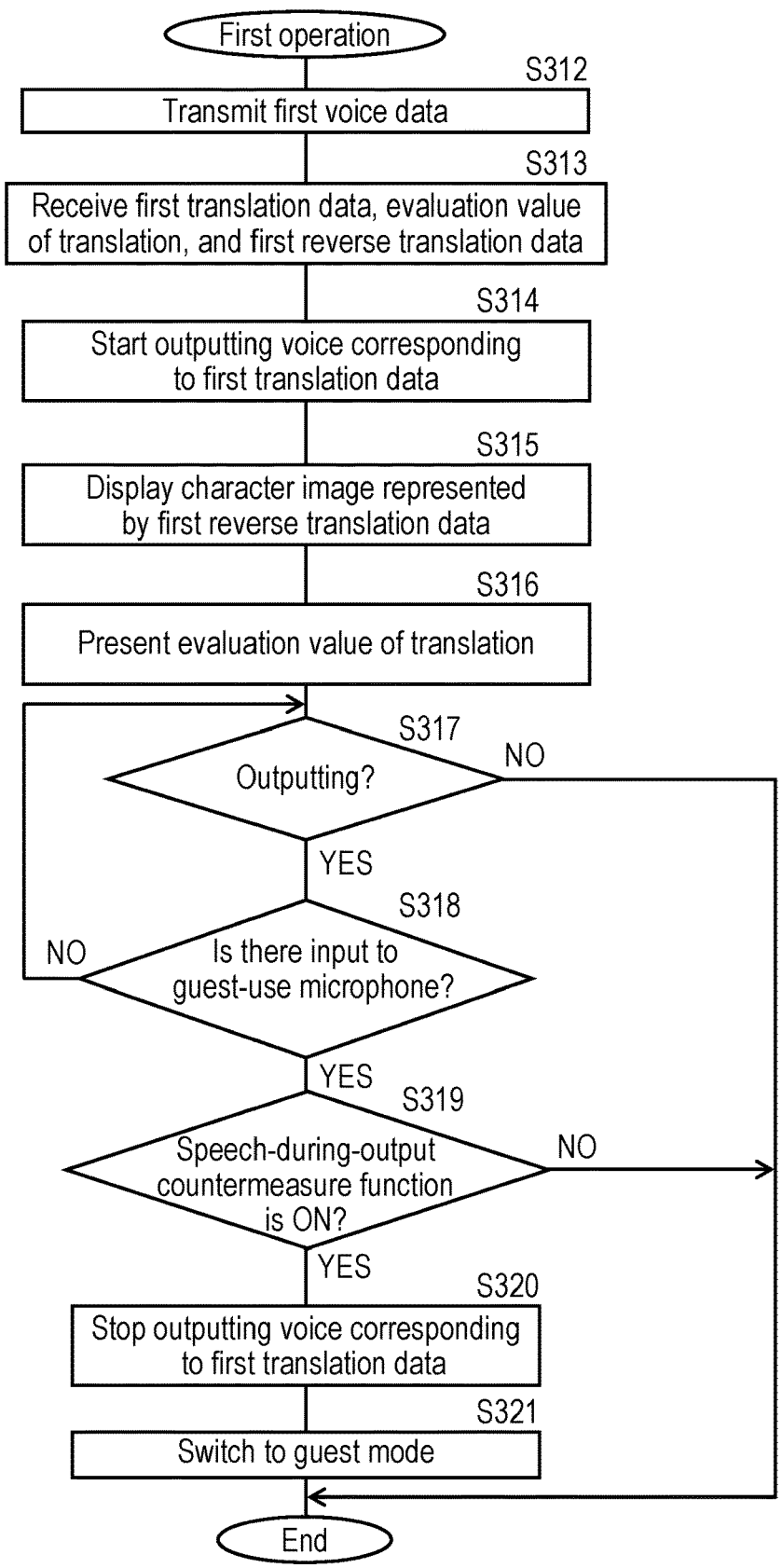
FIG. 16 is a flowchart showing a first operation in the host mode by the controller of the translation device according to the fourth exemplary embodiment.

Hereinafter, with reference to FIG. 15 and FIG. 16, the fourth exemplary embodiment will be described. Similar to the first to third exemplary embodiments, in the present exemplary embodiment, for convenience of description, a description will be given assuming that a translation device is used while being worn by a host (guide) (first user) guiding a guest (traveler) (second user) from abroad.

In the case of the translation device according to the first to third exemplary embodiments, even when a guest speaks while a voice is being output from guest-use speaker 22, the voice of the guest is not translated.

A translation device of the present exemplary embodiment includes, in addition to the functions of the first to third exemplary embodiments, a speech-during-output countermeasure function that addresses when the guest speaks while a voice is being output from guest-use speaker 22. A specific example is a function in which, when the guest speaks while a voice is being output from guest-use speaker 22, the voice from guest-use speaker 22 is interrupted and the speech of the guest is preferentially translated. The translation device of the present exemplary embodiment has a host mode and a guest mode similar to the third exemplary embodiment. The host mode is a mode in which the host mainly speaks. The guest mode is a mode in which the guest mainly speaks.

[3-1. Configuration]

[3-1-1. Physical Configuration of Translation Device]

A physical configuration of the translation device according to the present exemplary embodiment is the same as the physical configuration of the third exemplary embodiment except the following point.

Operation module 50 may have a speech-during-output countermeasure button (not shown) that is used to switch on/off the speech-during-output countermeasure function. Note that when the speech-during-output countermeasure function is off, translation device 10 according to the present exemplary embodiment performs an operation similar to the operation in the translation device according to the first or second exemplary embodiment. If operation module 50 does not have a speech-during-output countermeasure button, long-press of another button or simultaneous press of a plurality of buttons can be alternatively used. In the present exemplary embodiment, host mode switching button 512 and language selection button 53 are simultaneously pressed to switch on/off the speech-during-output countermeasure function.

[3-1-2. Electric Configuration of Translation Device]

An electric configuration of the translation device according to the present exemplary embodiment is the same as the physical configuration of the third exemplary embodiment except the following point. Hereinafter, the characteristic points of the fourth exemplary embodiment will be described.

Controller 33 controls the speech-during-output countermeasure function in addition to the control in the first or second exemplary embodiment. The speech-during-output countermeasure function is a function in which, when the guest speaks while a voice is being output from guest-use speaker 22, the voice from guest-use speaker 22 is interrupted and the speech of the guest is translated. Details will be described later.

Further, in the above-described way, the host can switch on/off the speech-during-output countermeasure function at any time. The speech-during-output countermeasure function is a function in which, when the guest speaks while a voice is being output from guest-use speaker 22, the voice from guest-use speaker 22 is interrupted and the speech of the guest is translated.

[3-2. Operation]

Controller 33 determines which mode the mode is, the host mode or the guest mode. If the mode is determined to be the host mode, controller 33 starts a basic operation in the host mode. If the mode is determined to be the guest mode, controller 33 starts a basic operation in the guest mode.

The basic operation in the host mode will be described with reference to FIG. 15. FIG. 15 is a flowchart showing the basic operation in the host mode. FIG. 16 is a flowchart showing a first operation in the host mode. The first operation according to the present exemplary embodiment will be described later in detail.

When the basic operation in the host mode is started, controller 33 determines whether a voice of the host is being input to host-use microphone 11 (step S301). If the voice of the host is not being input to host-use microphone 11 (step S301: NO), controller 33 repeats the above determination. If the voce of the host is being input to host-use microphone 11 (step S301: YES), host-use microphone 11 acquires a voice signal corresponding to the voice of the host (step S302). Controller 33 receives the voice signal from host-use microphone 11 and performs voice recognition to generated first voice data (step S303). Specifically, controller 33 generates the first voice data in a character string from the voice signal by referring to a reference table for voice recognition.

Next, controller 33 shifts to a host mode's first operation. The host mode's first operation is an operation in which a speech voice of host-use microphone 11 is translated and delivered to the guest.

The host mode's first operation of the present exemplary embodiment will be described from here with reference to a flowchart of FIG. 16. The host mode's first operation is an operation in which a speech voice of host-use microphone 11 is translated and delivered to the guest. If the host mode's first operation is started, controller 33 transmits the first voice data to translation server 100 via communication unit 31 and internet 200 (step S312). Translation server 100 translates the received first voice data to generate the first translation data in a character string and generates an evaluation value of this translation. Specifically, translation server 100 generates the first translation data corresponding to the first voice data by referring to a Japanese to English translation dictionary. Further, translation server 100 generates the evaluation value of this translation. The evaluation value is information indicating the accuracy of the translation result. As a method of translation and a method of calculation of an evaluation value of translation, a known technique such as BLEU or RIBES is used.

Further, translation server 100 reversely translates the first translation data into the language (Japanese) before the translation so as to generate first reverse translation data in a character string. Specifically, translation server 100 generates the first reverse translation data corresponding to the first translation data by referring to an English to Japanese translation dictionary stored in a memory or the like.

Next, controller 33 receives the first translation data, the evaluation value of the translation, and the first reverse translation data from translation server 100 via internet 200 and communication unit 31 (step S313).

Next, controller 33 performs voice synthesis on the first translation data to generate a voice signal and starts outputting a voice corresponding to the voice signal from guest-use speaker 22 (step S314). Specifically, controller 33 converts the first translation data in a character string into the voice signal, by referring to a reference table for English voice synthesis. This voice signal is converted into a voice by guest-use speaker 22 and is output.

Next, controller 33 generates a character image for displaying the first reverse translation data and causes host-use display 13 to display the character image (step S315). Further, controller 33 presents the evaluation value of the translation to the host by causing vibrator 40 to operate, depending on the evaluation value of the translation (for example, when the evaluation value is not greater than a predetermined threshold) (step S316). The above display and presentation enable the host to check whether the translation was performed correctly. The vibration at this time is preferably made different from the above-described vibration for informing that there is a simultaneous speech. Specifically, an interval time of the vibration may be changed.

Subsequently, controller 33 determines whether the output, from guest-use speaker 22, started in step S314 is continuing (step S317). If the output, from guest-use speaker 22, started in step S314 is finished (step S317: NO), controller 33 finishes the host mode's first operation. Controller 33 determines which mode the mode is, the host mode or the guest mode, following the flowchart of FIG. 10. If the mode is determined to be the host mode, controller 33 starts the basic operation in the host mode. If the mode is determined to be the guest mode, controller 33 starts the basic operation in the guest mode.

If the output, from guest-use speaker 22, started in step S314 is continuing (step S317: YES), controller 33 determines whether there is an input to guest-use microphone 21 (step S318). If there is no input to guest-use microphone 21 (step S318: NO), controller 33 goes back to S317 again and determines whether the output is continuing.

If there is an input to guest-use microphone 21 (step S318: YES), controller 33 determines whether the speech-during-output countermeasure function is on (step S319). If the speech-during-output countermeasure function is off (step S319: NO), controller 33 finishes the host mode's first operation. Controller 33 determines which mode the mode is, the host mode or the guest mode, following the flowchart of FIG. 10. If the mode is determined to be the host mode, controller 33 starts the basic operation in the host mode. If the mode is determined to be the guest mode, controller 33 starts the basic operation in the guest mode.

If the speech-during-output countermeasure function is on (step S319: YES), controller 33 forcibly stops the output, from guest-use speaker 22, started in step S314 (step S320). After the forced stop, controller 33 switches to the guest mode (step S321). As described above, controller 33 finishes the host mode's first operation in the case that the speechduring-output countermeasure function is on. After that, the operation is performed in the guest mode; therefore, the speech of the guest is preferentially translated.

Other Exemplary Embodiments

As described above, the first to fourth exemplary embodiments have been described as an illustrative example of the technique disclosed in the present application. However, the technique in the present disclosure is not limited to the above exemplary embodiments and can also be applied to an exemplary embodiment in which modification, replacement, addition, omission, or the like is performed appropriately. Further, it is possible to form a new exemplary embodiment by combining the respective components described in the first to fourth exemplary embodiments. Therefore, other exemplary embodiments will be illustrated as an example below.

(1) In the first to fourth exemplary embodiments, translation device 10 is disclosed as an example. Translation device 10 includes hat 20 to which microphone 11, speaker 12, and display 13 for a host and microphone 21, speaker 22, and display 23 for a guest are attached. However, the present disclosure is not limited to the above configuration, and microphone 11, speaker 12, and display 13 for the host and microphone 21, speaker 22, and display 23 for the guest may be attached to any of various attachment members, other than a hat, to be worn on a human body (for example, a head band). Further, in this case, translation device 10 may include a plurality of attachment members. In this case, microphone 11, speaker 12, and display 13 for the host may be attached on an attachment member different from an attachment member to which microphone 21, speaker 22, and display 23 for the guest are attached. In this case, the plurality of attachment members should be used being attached to the same person. In the case that host-use microphone 11, speaker 12, and the like are attached to an attachment member other than a hat, speaker 12 should be attached to the attachment member such that speaker 12 is in contact with an ear of the host when the attachment member is attached to a head or the like of the host.

(2) In the first and second exemplary embodiments, operation module 50 has host-use speech button 51 and guest-use speech button 52; however, operation module 50 may have only one common speech button as a speech button for the host and guest. In this configuration, controller 33 may monitor signals (for example, magnitude of signals corresponding to volumes) from host-use microphone 11 and guest-use microphone 21 after the host presses down the common speech button, so that controller 33 determines which of the host and guest is speaking. Specifically, in response to the pressing down of the speech button by the host, translation device 10 records the voice signals from both of microphone 11 and microphone 21. If microphone 11 receives a voice and outputs a voice signal greater than a predetermined value, translation device 10 translates the voice signal received by microphone 11 from the host's language to the guest's language. Alternatively, if microphone 21 receives a voice and outputs a voice signal greater than a predetermined value, translation device 10 performs control such that the voice signal received by microphone 21 is translated from the guest's language to the host's language.

(3) In the first to fourth exemplary embodiments, controller 33 recognizes the start of voice input and the selection of a translation language when some types of operation buttons of operation module 50 are operated by the host. However, the present disclosure is not limited to the above operation, and controller 33 may identifies the start of voice input by being triggered by the fact that the host and guest start to speak or may select a translation language by analyzing the language of the voice of the host and guest.

(4) If the host does not know what language the guest speaks, the host may change the language to be dealt with by pressing a language selection button. For example, in the case that the supported languages are English, Chinese, and Korean, every time when the host pushes the language selection button, translation device 10 outputs sequentially typical greetings, "Hello" in English, "Ni Hao" in Chinese, and "Annyeonghaseyo" in Korean from at least one of guest-use speaker 22 and display 23. At the time when the guest starts speaking in response to the greetings, translation device 10 may identify the language spoken by the guest, on the basis of at least one of the language of the greetings just before the guest starts speaking and the language spoken by the guest. The phrase at this time is not limited to typical greetings and may be descriptions such as "This is a translation device". or "Please speak in . . . language".

(5) It is difficult for the guest to know when to start speaking; therefore, guest-use display 23 may display "Please speak . . . language". when the host pushes the guest-use speech button 52.

(6) Further, it is difficult for the guest to know when to start speaking; therefore, the guest speaks, in some cases, simultaneously while the host is speaking. At this time, it is desirable to translate not the speech of the host but the speech of the guest. In order to solve this problem, specifically, at the same time when recording is performed using host-use microphone 11, recording is also performed using guest-use microphone 21. Then, in the case that a signal was input to guest-use microphone 21, after the recording using the guest-use microphone is completed, the recorded data of guest-use microphone 21 may be translated instead of the recorded data of host-use microphone 11. Since host-use microphone 11 and guest-use microphone 21 are relatively close to each other, the voice of the host is superposed on the recorded data of guest-use microphone 21. Therefore, it is preferable that noise be reduced by, for example, subtracting the recorded data of host-use microphone 11 from the recorded data of guest-use microphone 21.

(7) In the first exemplary embodiment, translation server 100 connected to translation device 10 via internet 200 performs the translation, and translation device 10 performs the voice recognition processing and the voice synthesis processing. However, the present disclosure is not limited to the above configuration, and translation server 100 may perform also the voice recognition processing and the voice synthesis processing. Alternatively, there may be additionally provided a voice recognition server for performing voice recognition and a voice synthesis server for performing voice synthesis, and each of the voice recognition server and the voice synthesis server connected to translation device 10 via internet 200 may perform the voice recognition processing or the voice synthesis processing.

(8) In the first to fourth exemplary embodiments, microphone 11 and microphone 21 receive voice signals, and controller 33 generates voice data; however, the present disclosure is not limited to this configuration. Each of microphone 11 and microphone 21 may include an A/D converter to generate voice data. Specifically, microphone 11 (first receiver) may receive the voice of the host and generate the voice data (first voice data) corresponding to the voice of the host. Further, microphone 21 (second receiver) may receive the voice of the guest and generate the voice data (second voice data) corresponding to the voice of the guest.

(9) In the third and fourth exemplary embodiments, controller 33 generates the third voice data; however, the present disclosure is not limited to this configuration. Communication unit 31 may transmit the first voice data and the second voice data to translation server 100, and translation server 100 may generate the third voice data on the basis of the first voice data and the second voice data. Specifically, translation server 100 may generate the third voice data by subtracting data based on the first voice data from the second voice data.

(10) In the third exemplary embodiment, translation server 100 generates the third translation data; however, the present disclosure is not limited to this configuration. Similar to the second exemplary embodiment, controller 33 may generate the third translation data.

As described above, the exemplary embodiments have been described as examples of the technique in the present disclosure. For this purpose, the attached drawings and the detailed description have been provided.

Therefore, the components illustrated in the attached drawings and described in the detailed description may include, for the illustration of the above-described technique, not only components essential for the solution to the problem but also components not essential for the solution to the problem. Thus, it should not be immediately deemed that, merely based on the fact that the components that are not essential have been illustrated in the attached drawings and described in the detailed description, the components that are not essential are essential.

In addition, because the above exemplary embodiments are for illustrating the technique in the present disclosure as examples, various modifications, replacements, additions, removals, or the like can be made without departing from the scope of the claims or the equivalent thereto.

INDUSTRIAL APPLICABILITY

The present disclosure can be applied to a translation device that translates a conversation between a first user and a second user.

REFERENCE MARKS IN THE DRAWINGS

10: translation device
11: microphone (first receiver)
12: speaker (first output unit)
13: display (first display unit)
14: support member
15: headset
20: hat
21: microphone (second receiver)
22: speaker (second output unit)
23: display (second display unit)
30: control module
31: communication unit
32: storage
33: controller
40: vibrator (evaluation presentation unit)
50: operation module
51, 52: speech button
53: language selection button
100: translation server
200: internet

The invention claimed is:

1. A translation device comprising:
  a hat;
  a first receiver that receives a first voice and converts the first voice into a first voice signal, the first voice being voice of a first user, the first user wearing the hat;
  a second receiver that receives a second voice and converts the second voice into a second voice signal, the second voice being voice of a second user, the second user being different from the first user;
  a first output unit that outputs a voice corresponding to second translation data generated by translating second voice data based on the second voice signal;
  a second output unit that outputs a voice corresponding to first translation data generated by translating first voice data based on the first voice signal; and
  an evaluation presentation unit that presents, by using vibration, to the first user an evaluation value of translation from the first voice data to the first translation data and an evaluation value of translation from the second voice data to the second translation data, wherein
  the first receiver is disposed near a mouth of the first user,
  the first output unit is disposed at a position at which the first output unit is in contact with an ear of the first user,
  the second receiver and the second output unit are disposed on a front outer surface of the hat so as to increase isolation between the voice output by the first output unit and the voice output by the second output unit, and to increase isolation between the first voice received by the first receiver and the second voice received by the second receiver, and
  the evaluation presentation unit is disposed inside the hat.

2. The translation device according to claim 1, wherein the second receiver and the second output unit are directed in a same direction as a face of the first user is directed.

3. The translation device according to claim 1, wherein the first receiver and the first output unit constitute a headset.

4. The translation device according to claim 1, further comprising:
  a first display unit that displays a character image represented by first reverse translation data, the first reverse translation data being generated by reversely translating the first translation data; and
  a second display unit that displays a character image represented by second reverse translation data, the second reverse translation data being generated by reversely translating the second translation data.

5. The translation device according to claim 4, wherein
  the first display unit is disposed near an eye of the first user, and
  the second display unit is disposed on the front outer surface of the hat.

6. The translation device according to claim 1, further comprising a controller that generates the first translation data and the second translation data.

7. The translation device according to claim 1, further comprising a communication unit that communicates with a translation server,
  wherein the communication unit transmits the first voice data and the second voice data to the translation server and receives the first translation data and the second translation data generated by the translation server.

8. A translation device comprising:
  a hat;
  a first receiver that receives a first voice and converts the first voice into a first voice signal, the first voice being voice of a first user, the first user wearing the hat;

a second receiver that receives a second voice and converts the second voice into a second voice signal, the second voice being voice of a second user, the second user being different from the first user;

a first output unit that outputs a voice corresponding to second translation data generated by translating second voice data based on the second voice signal;

a second output unit that outputs a voice corresponding to first translation data generated by translating first voice data based on the first voice signal; and an evaluation presentation unit that presents, by using vibration, to the first user an evaluation value of translation from the first voice data to the first translation data and an evaluation value of translation from the second voice data to the second translation data, wherein the first receiver and the first output unit constitute a headset, the second receiver and the second output unit are disposed on a front outer surface of the hat so as to increase isolation between the voice output by the first output unit and the voice output by the second output unit, and to increase isolation between the first voice received by the first receiver and the second voice received by the second receiver, and the evaluation presentation unit is disposed inside the hat.

9. A device comprising:
a hat;
a first receiver that receives a first voice and converts the first voice into a first voice signal, the first voice being voice of a first user, the first user wearing the hat;

a second receiver that receives a second voice and converts the second voice into a second voice signal, the second voice being voice of a second user, the second user being different from the first user;

a first output unit that outputs a voice corresponding to second generated data generated based on the second voice signal;

a second output unit that outputs a voice corresponding to first generated data generated based on the first voice signal; and an evaluation presentation unit that presents, by using vibration, to the first user an evaluation value of translation from the first voice data to the first translation data and an evaluation value of translation from the second voice data to the second translation data, wherein the first receiver and the first output unit constitute a headset, and the second receiver and the second output unit are disposed on a front outer surface of the hat so as to increase isolation between the voice output by the first output unit and the voice output by the second output unit, and to increase isolation between the first voice received by the first receiver and the second voice received by the second receiver, and the evaluation presentation unit is disposed inside the hat.

* * * * *